(12) United States Patent
Calvert et al.

(10) Patent No.: US 10,842,088 B1
(45) Date of Patent: Nov. 24, 2020

(54) HOP YARD STRINGING APPARATUS AND METHOD

(71) Applicant: Hagoth Industries, LLC, Pendleton, OR (US)

(72) Inventors: Sean G. Calvert, Walla Walla, WA (US); Justin D. Mack, Kennewick, WA (US); Marvin R. Hair, Milton-Freewater, OR (US)

(73) Assignee: HAGOTH INDUSTRIES, LLC, Pendleton, OR (US)

( * ) Notice: Subject to any disclaimer, the term of this patent is extended or adjusted under 35 U.S.C. 154(b) by 201 days.

(21) Appl. No.: 15/950,937

(22) Filed: Apr. 11, 2018

(51) Int. Cl.
| | |
|---|---|
| *A01G 17/00* | (2006.01) |
| *A01G 17/04* | (2006.01) |
| *B65H 61/00* | (2006.01) |

(52) U.S. Cl.
CPC ............. *A01G 17/04* (2013.01); *B65H 61/00* (2013.01)

(58) Field of Classification Search
CPC ...... A01G 17/04; A01G 17/085; A01G 17/08; A01G 17/06
USPC .................. 47/1.01 S, 1.01 R, 44, 45, 46, 47
See application file for complete search history.

(56) References Cited

U.S. PATENT DOCUMENTS

| | | | |
|---|---|---|---|
| 2,641,084 A | 9/1950 | Estes | |
| 2,753,661 A | 11/1953 | Wiemers | |
| 3,034,259 A | 11/1960 | Herr | |
| 3,045,936 A * | 7/1962 | Ruggeri | A01G 17/085 242/470 |
| 3,267,609 A | 8/1966 | Rasmussen | |
| 3,747,267 A * | 7/1973 | Paulk | A01G 17/085 47/1.01 R |
| 3,771,257 A * | 11/1973 | Smith | A01G 17/085 47/1.01 R |
| 3,785,087 A * | 1/1974 | Cook | A01G 17/085 47/1.01 R |
| 4,205,602 A * | 6/1980 | Lenker | B65B 27/00 100/21 |

FOREIGN PATENT DOCUMENTS

| | | |
|---|---|---|
| DE | 2908220 | 3/1979 |
| DE | 29809058 | 8/1998 |
| DE | 29908729 | 8/1999 |
| DE | 10009292 | 9/2001 |
| DE | 102005015528 | 5/2006 |
| FR | 2419010 | 3/1979 |
| FR | 2569525 | 3/1986 |
| RU | 2080050 | 5/1997 |
| WO | 1997006667 | 2/1997 |

* cited by examiner

*Primary Examiner* — Trinh T Nguyen
(74) *Attorney, Agent, or Firm* — Dennis D. Brown; Brown Patent Law, P.L.L.C.

(57) ABSTRACT

A hop yard stringing system which includes: a trailer mounted worker platform; a measuring and cutting device which automatically measures and cuts bine support lines of desired length for attachment to overhead trellis lines; a plunger assembly on the back end of the trailer for staking the lower ends of the lines into the ground; a line transfer device which transfers the lower ends of the lines to the plunger assembly; an anchor forming assembly which forms staking anchors for the plunger assembly; a line tension monitoring system for the staked lines; and a GPS system which activates the plunger to stake the lines at predetermined GPS locations.

15 Claims, 28 Drawing Sheets

HOP YARD STRINGING APPARATUS AND METHOD

FIELD OF THE INVENTION

The present invention relates to apparatuses and methods for stringing and staking bine support lines from overhead trellis networks used in hops growing yards.

BACKGROUND OF THE INVENTION

Hop cones ("hops") contain oils which impart flavor and aroma to beer. The hops are harvested from hop bines which can grow to a height of as much as 25 feet or more. The hop bines are produced from rhizomes which are preferably planted in mounds so that the plants are slightly elevated. Each plant will produce multiple hop bines.

In a commercial hops operation, the plants will typically be grown in a "hop yard" wherein (a) the hop mounds for the individual plants are formed in a series of parallel rows and (b) the growth of the hop bines produced from the individual plants is supported by a trellis system. The individual hop mounds in each row will typically be spaced about 3 feet apart and the lateral distance between the parallel rows will typically be in the range of from about 7 to about 8 feet.

The hop yard trellis system used for supporting the hop bines will typically comprise (a) an overhead trellis network which is arrayed at a height of from about 16 to about 22 feet above ground level and (b) multiple bine support lines which extend downwardly form the overhead trellis network to the individual hop mounds. The overhead trellis network will typically comprise an array of substantially horizontal overhead lines which (i) run laterally with respect to the rows of hop mounds, (ii) run parallel to the rows of hop mounds, or (iii) both.

To support the hop bines which grow from each plant, a set of bine support lines, corresponding to the number of bines retained for each plant, are secured between each hop mound and the overhead trellis network. To provide room for sunlight and growth, the set of bine support lines installed for each hop mound will preferably extend upwardly at an outward angle such that the bine support lines diverge outwardly away from each other. After the bines emerge from the plants, the bines are trained to grow up the bine support lines by wrapping the bines around the lines.

Each spring, a new set of upwardly extending bine support lines must be installed for each of the hop mounds. However, the methods which have been used heretofore for installing the upwardly extending bine support lines have been very labor intensive, time consuming, imprecise, and costly. Typically, for example, one or more workers on an elevated platform have been pulled through the hop yard along each row of hop mounds so that, as each succeeding mound approaches, each worker must pull two strings (i.e., one for each hand) of about 20 feet in length from a bundle of strings and tie an end of each string to an overhead trellis line such that the lines hang downwardly from the overhead trellis line on opposite sides of the hop mound. Moreover, depending upon the number of bines retained for each plant, the worker will commonly be required to perform this step two or more times for each mound.

Subsequently, after hanging the bine support lines from the overhead trellis network, the workers must walk through the hop yard along each row and manually stake the lower ends of the bine support lines into the ground next to the hop mounds.

Consequently, a need exists for a hop yard stringing apparatus and method which are more precise and reliable, and are significantly less labor intensive, time consuming, and costly.

SUMMARY OF THE INVENTION

The present invention satisfies the needs and alleviates the problems discussed above.

In one aspect, that is provided an apparatus for stringing a hop yard which comprises: a non-powered or powered vehicle; a worker platform structure on the non-powered or powered vehicle; a line staking assembly on the non-powered or powered vehicle which stakes a lower end portion of a segment of the stringing line at, below, or above a ground level; and a line transfer assembly on the non-powered or powered vehicle which transfers the lower end portion of the segment of the stringing line from the worker platform structure to the line staking assembly.

The line transfer assembly used in the hop yard stringing apparatus preferably comprises: (i) a transfer chain, belt or cable which extends between the worker platform structure and the line staking assembly and (ii) at least one line clip attached to the transfer chain, belt, or cable which is transferred by the transfer chain, belt, or cable from an upper end of the line transfer assembly to a lower end on the line transfer assembly and is subsequently transferred by the transfer chain, belt, or cable from the lower end of the line transfer assembly back to the upper end of the line transfer assembly.

The line staking assembly used in the hop yard stringing apparatus preferably comprises: (i) a line receiving structure into which the lower end portion of the segment of stringing line is delivered by the line transfer assembly; (ii) a staking plunger, and (iii) a powered piston which drives the staking plunger vertically downward in a plunging movement when the powered piston is extended and raises the staking plunger vertically upward when the powered piston is contracted.

The staking plunger preferably includes a staking element or structure which takes the lower end portion of the segment of the stringing line from the line receiving structure, as the staking plunger is driven vertically downward in the plunging movement, and drives the lower end portion of the segment of the stringing line into the ground. In addition, the stringing apparatus can include (a) a sliding base structure to which the lower end of the powered piston is attached and/or (b) a linkage structure connected between the upper end of the powered piston and the staking plunger such that, when the powered piston pushes a first end of the linkage structure upward, a second end of the linkage structure drives the staking plunger downward.

The hop yard stringing apparatus also preferably comprises an anchor forming assembly which includes: (i) a vertical base plate mounted in fixed position with respect to sliding base structure of the plunger assembly, (ii) a pair of anchor wire supports attached to the vertical base plate such that a segment of anchor wire will rest on top of the anchor wire supports, the anchor wire supports being spaced apart so that the staking element or structure of the staking plunger will travel downwardly between the anchor wire supports; and (iii) a spring loaded wire bending foot which projects through the vertical base plate between the anchor wire supports.

The hop yard stringing apparatus also preferably comprises a line tension monitoring assembly mounted on the sliding base structure of the plunger assembly. The tension monitoring assembly preferably comprises a proximity switch and a spring mounted tension arm which (i) is pivotably mounted with respect to the proximity switch and (ii) is contacted by the segment of the stringing line and pushed by the segment of the stringing line toward the proximity switch as the staking plunger drives the lower end portion of the segment of the stringing line into the ground.

In addition, the hop yard stringing apparatus preferably comprises a GPS instrument on the non-powered or powered vehicle, or on another powered vehicle which pulls the apparatus. The line staking assembly will preferably automatically stake the lower end portion of the segment of the stringing line at, below, or above ground level when the line staking assembly is positioned over a predetermined GPS staking location.

In another aspect, there is provided an apparatus for stringing a hop yard which preferably comprises: a non-powered or powered vehicle; a worker platform structure on the non-powered or powered vehicle; and a line measuring and cutting assembly on the worker platform structure. The line measuring and cutting assembly preferably comprises: (i) a housing having an inlet opening for a stringing line and a discharge opening for the stringing line, (ii) a driven wheel or driven roller mounted in the housing and an idler wheel or idler roller mounted in the housing adjacent to the driven wheel or driven roller to form a pulling nip between the driven wheel or driven roller and the idler wheel or idler roller which receives and pulls the stringing line from the inlet opening and discharges the stringing line for delivery through the discharge opening. (iii) a length detecting or measuring device (e.g., an encoder) in the housing which measures, or detects, a predetermined length of the stringing line, and (iv) a cutting device positioned in the housing which cuts the stringing line discharged from the pulling nip when a segment of the stringing line of the predetermined length is discharged from the pulling nip.

Further aspects, features, and advantages of the present invention will be apparent to those in the art upon examining the accompanying drawings and upon reading the following Detailed Description of the Preferred Embodiments.

BRIEF DESCRIPTION OF THE DRAWINGS

FIG. 15 shows an anchor forming assembly 142 and a staking plunger assembly 144 which are included in the line staking assembly 32.

FIG. 16 shows the anchor forming assembly 142 and a wire feeding assembly 34 which are included in the line staking assembly 32.

FIG. 30 is a rear perspective view of the feeding and cutting assembly 40a.

DETAILED DESCRIPTION OF THE PREFERRED EMBODIMENTS

Figure 1:
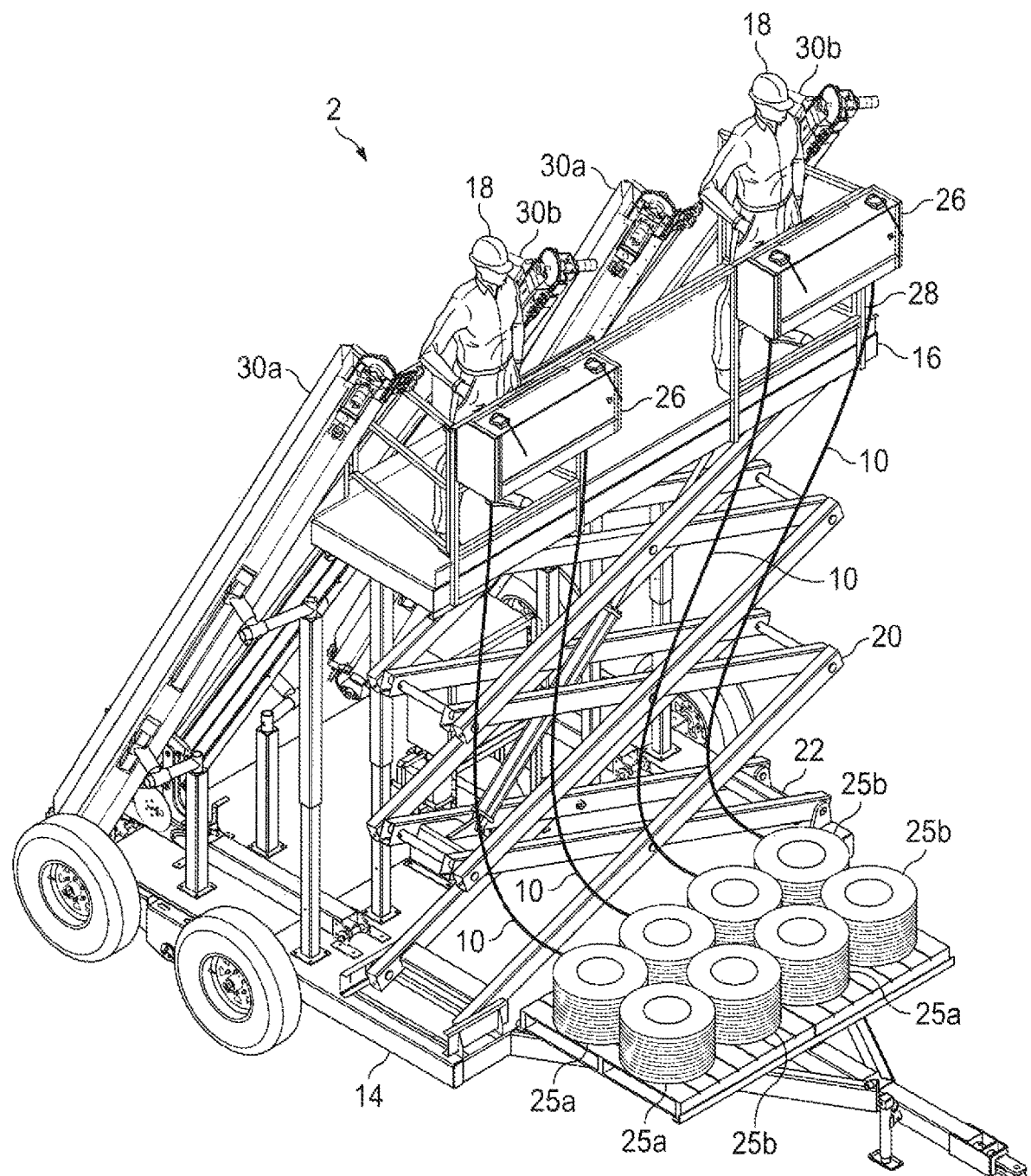
FIG. 1 is a front perspective view of an embodiment 2 of the hop yard stringing apparatus provided by the present invention.
Figure 2:
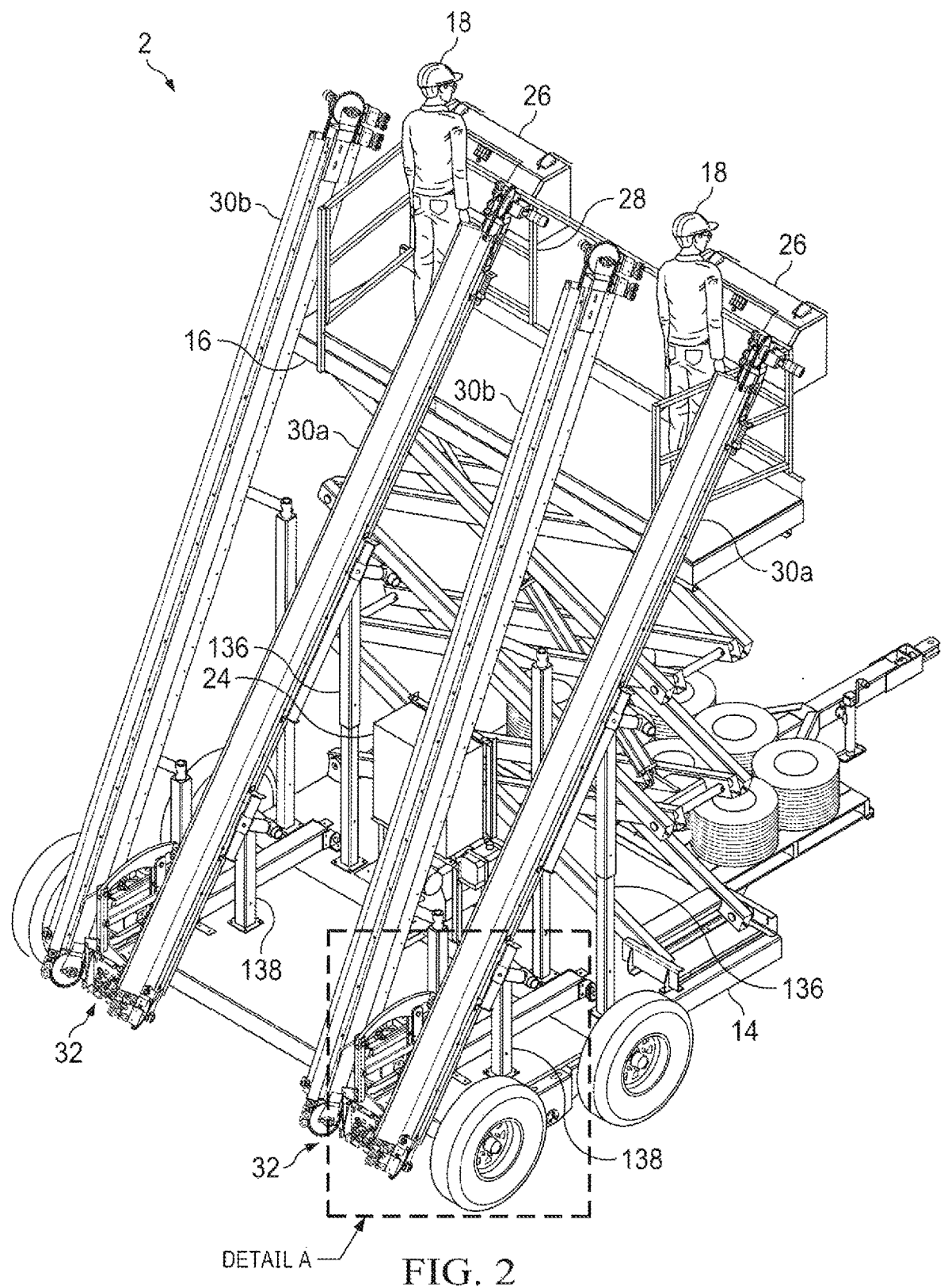
FIG. 2 is a rear perspective view of the inventive stringing apparatus 2.
Figure 3:
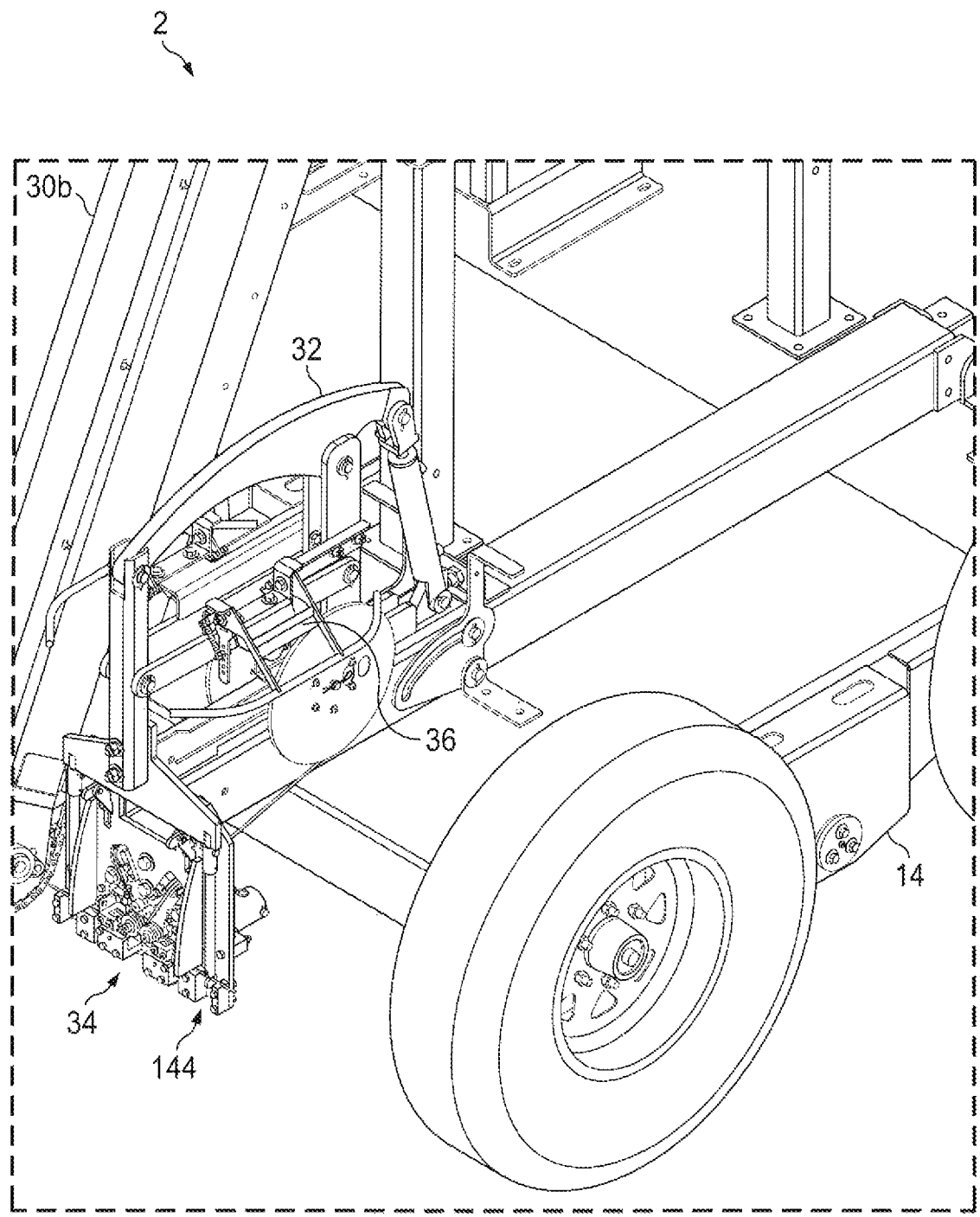
FIG. 3 is an enlarged view of Detail A shown in FIG. 2.
Figure 4:
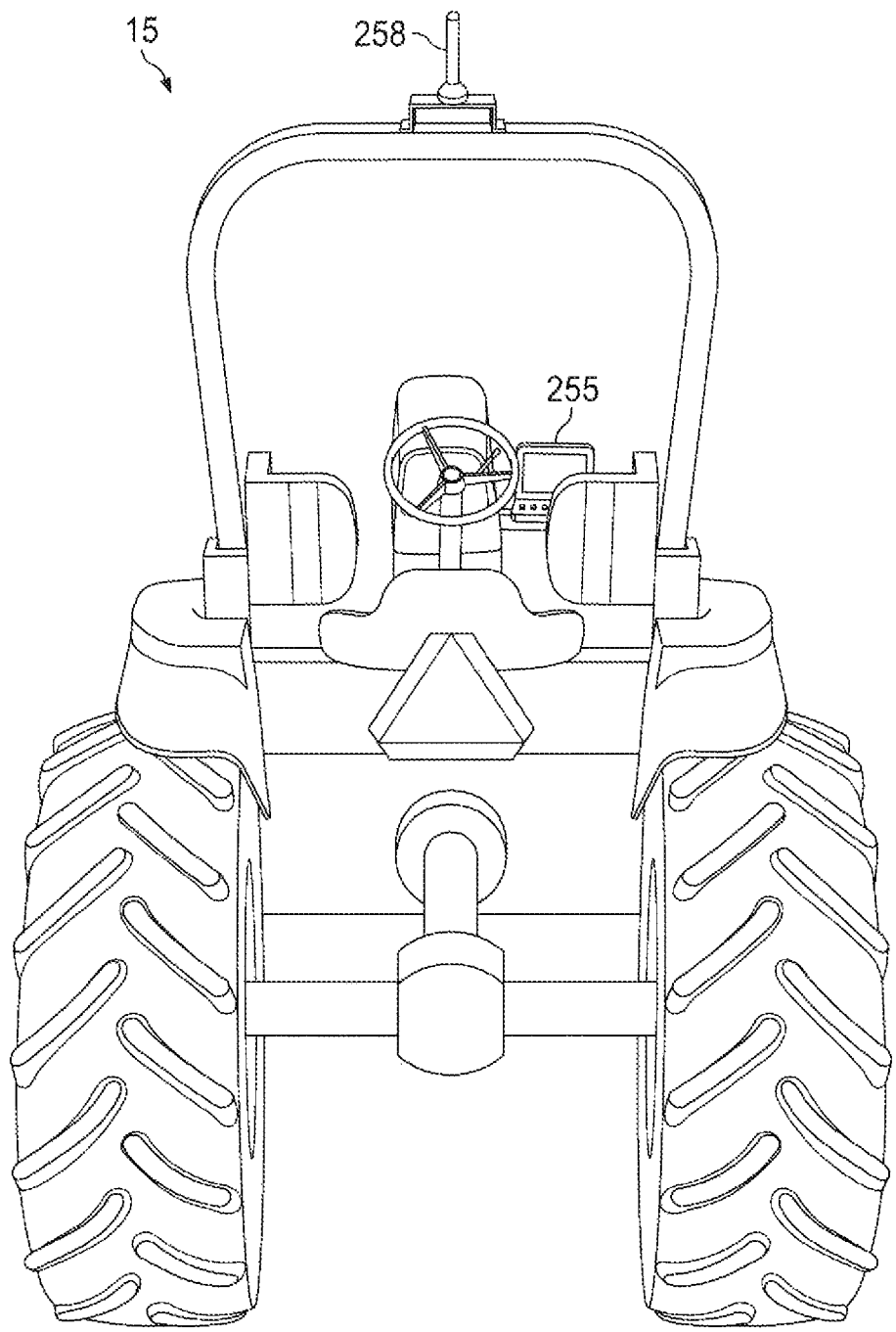
FIG. 4 is a rear view of a powered vehicle used for pulling the inventive stringing apparatus 2 over one or more rows of hop mounds 6.

An embodiment 2 of the inventive hop yard stringing apparatus is illustrated in FIGS. 1-3. The embodiment 2 of the inventive stringing apparatus 2 shown in FIGS. 1-3 is constructed for carrying two workers 18 over two rows of hop mounds 6 and for measuring, cutting, and stringing a total of two or more (preferably four) segments of a bine support line 10 for each one of the mounds 6 in each of the two rows. In other words, for each hop mound 6, two succeeding right hand line segments 10a and 10b of desired length and two succeeding left hand line segments 10c and 10d of desired length (see FIGS. 14 and 22A-22C) will be automatically measured and cut and then, after the upper ends of the line segments 10a, 10b, 10c, and 10d are tied or otherwise connected to a cable of an overhead trellis network 12, the lower ends of the line segments 10a, 10b, 10c, and 10d will be automatically staked into the ground adjacent to the hop mound 6.

It will be understood, however, that the inventive apparatus 2 can alternatively be constructed for carrying one worker 18 over a single row of hop mounds 6, or for carrying three or more workers 18 over more than two rows of mounds 6.

The inventive stringing apparatus 2 comprises: a trailer 14 or other non-powered or powered support vehicle (preferably a non-powered support vehicle which is pulled behind a tractor or other powered vehicle 15); a worker platform structure 16 for the two workers 18; a scissor lift 20 mounted on the floor 22 of the trailer 14 for raising and lowering the worker platform structure 16; and a hydraulic power station 24 mounted on the trailer 14 for powering the scissor lift 20 and/or other hydraulic motors or systems, discussed below, which may be used in the inventive stringing apparatus 2.

For each worker 18 on the worker platform structure 16, the inventive stringing apparatus 2 preferably comprises: one or more right hand line spools 25a and one or more left hand line spools 25b, which are removably placed on the floor 22 of the trailer 14; a line measuring and cutting assembly 26 mounted on a front rail 28 of the worker platform structure 16; a right hand line transfer assembly 30a which, during operation, extends downwardly at an angle from the elevated worker platform structure 16 to the back end of the trailer 14; a left hand line transfer assembly 30b which, during operation, extends downwardly at an angle from the elevated worker platform structure 16 to the back end of the trailer 14; a line staking and anchoring assembly 32 mounted at the rear of the trailer 14 for staking the right hand line segments 10a and 10b and the left hand line segments 10e and 10d into the ground; an anchor wire feeding assembly 34; and a line tension monitoring assembly 36.

Preferably, two right hand line supply spools 25a and two left hand line supply spools 25b will be provided on the trailer 14 for each worker 18. For the pair of right hand spools 25a, the lines 10 of the two spools 25a will preferably be connected end-to-end so that when the first right hand spool 25a is depleted, the line 10 will automatically continue to be supplied by the second right hand spool 25a. In the same way, for the pair of left hand spools 25b, the lines 10 of the two spools 25b will preferably be connected end-to-end so that when the first left hand spool 25b is depleted, the line 10 will automatically continue to be supplied by the second left hand spool 25b.

By way of example, but not by way of limitation, the lines 10 supplied to the line measuring and cutting assembly 26 may be organic (e.g., coconut, paper, or other) or synthetic (e.g., polymer). The lines 10 can also be treated to slow decay, or can be untreated. In addition, rather being placed flat on the trailer 14 as shown, the line supply spools 25a and 25b can be mounted, for example, on a shaft for rotating when feeding the lines 10 to the right hand and left hand sides of the line measuring and cutting assembly 26, or can be replaced with large center-pull balls of line. Also, as yet another alternative, the lines 10 used in the inventive apparatus and method can be individually pre-cut to the appropriate length for the hop yard.

Figure 5:
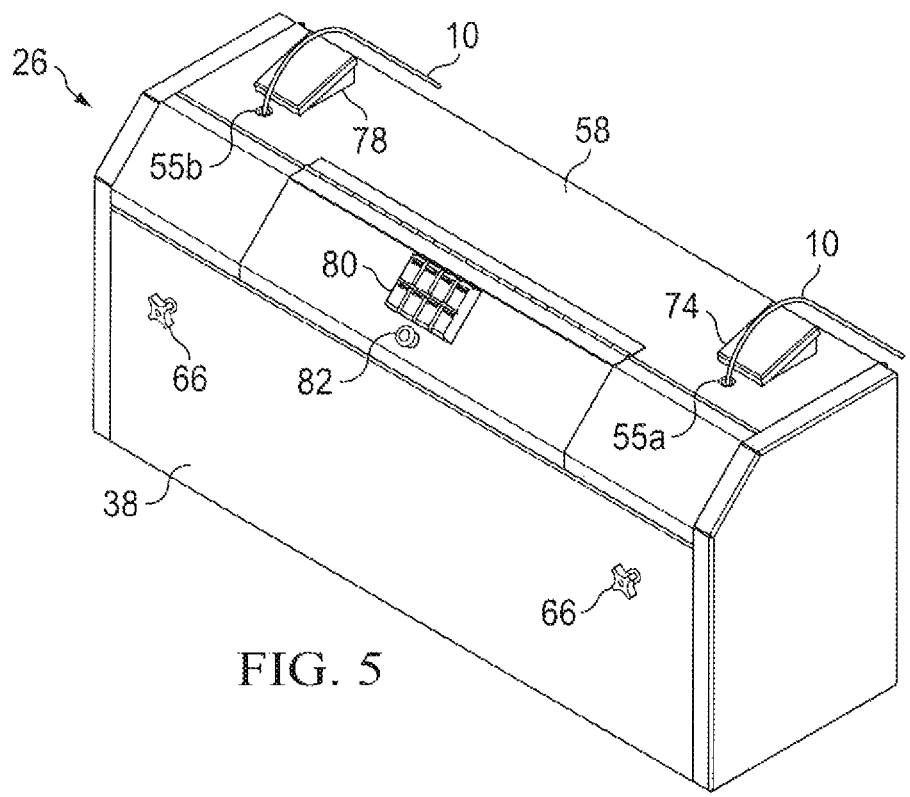
FIG. 5 is a perspective view of an embodiment 26 of a line measuring and cutting assembly used in the inventive stringing apparatus 2.
Figure 6:
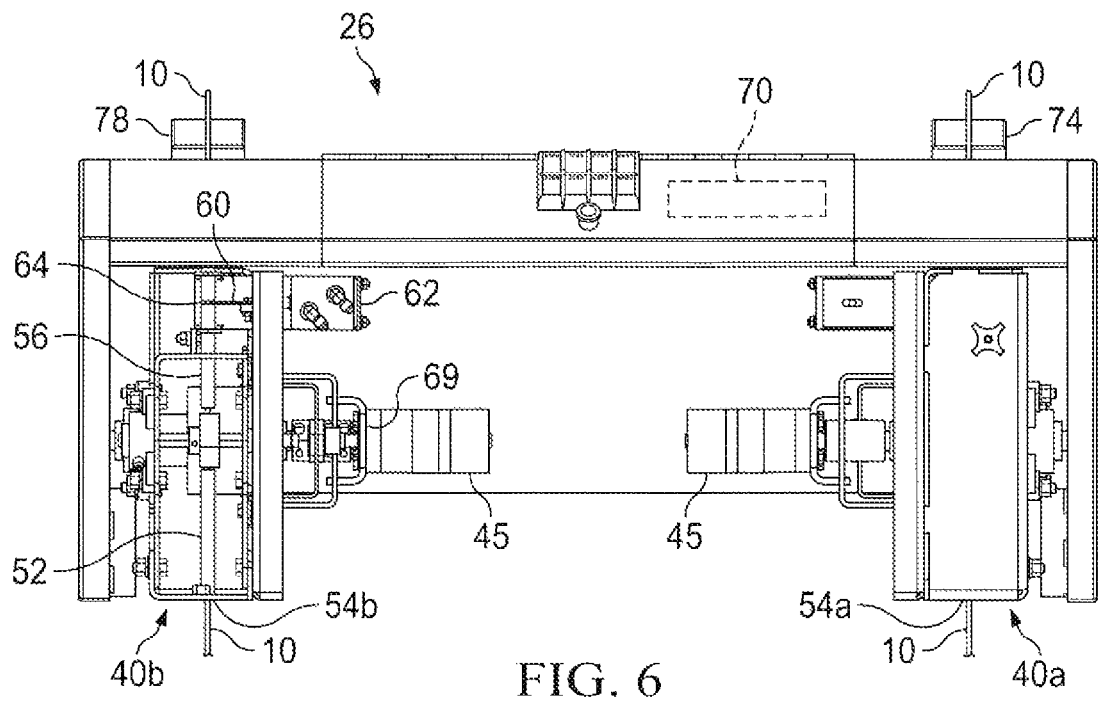
FIG. 6 is a cutaway elevational front view of the line measuring and cutting assembly 26.
Figure 7:
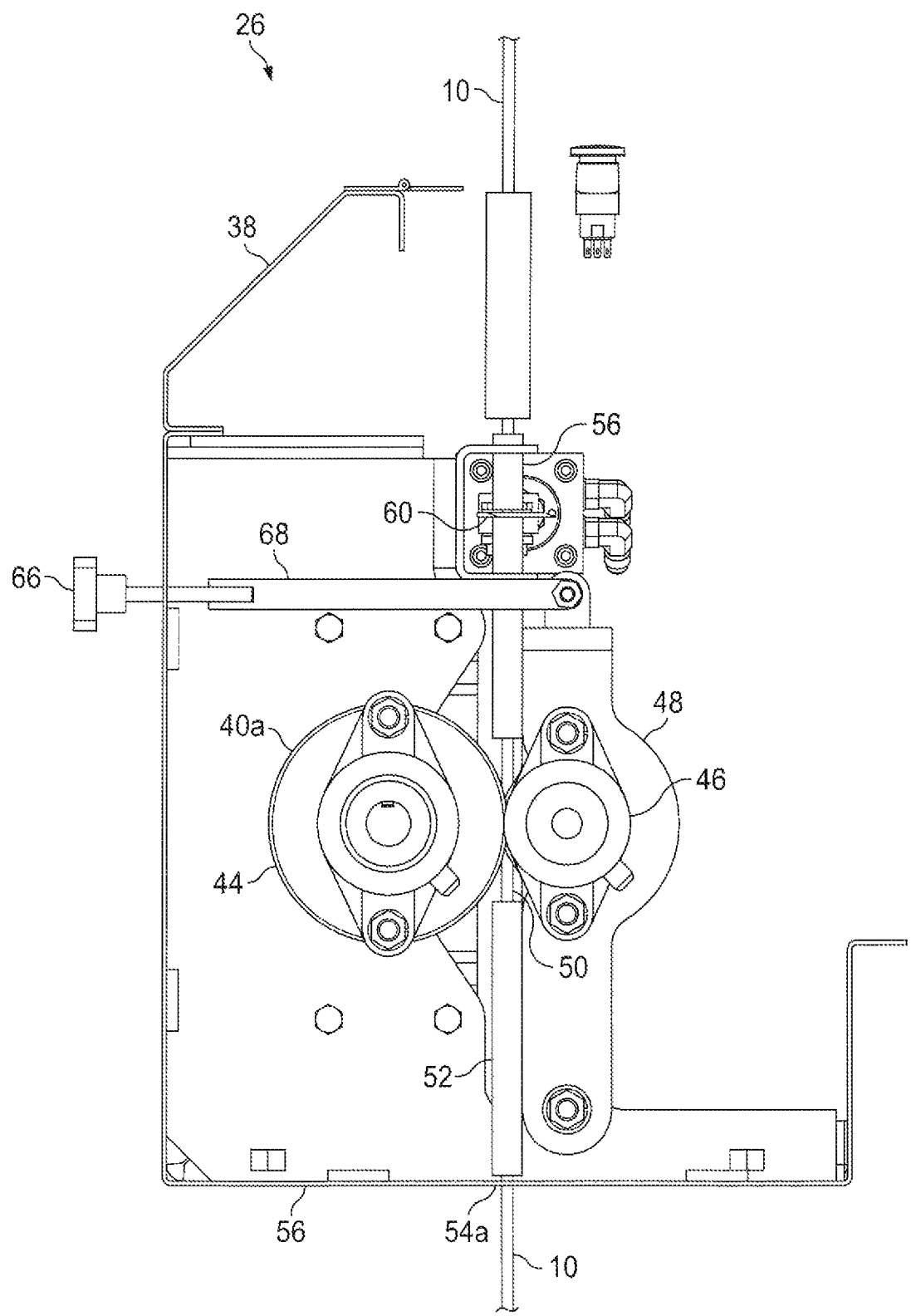
FIG. 7 is a cutaway elevational side view of the line measuring and cutting assembly 26.
Figure 8:
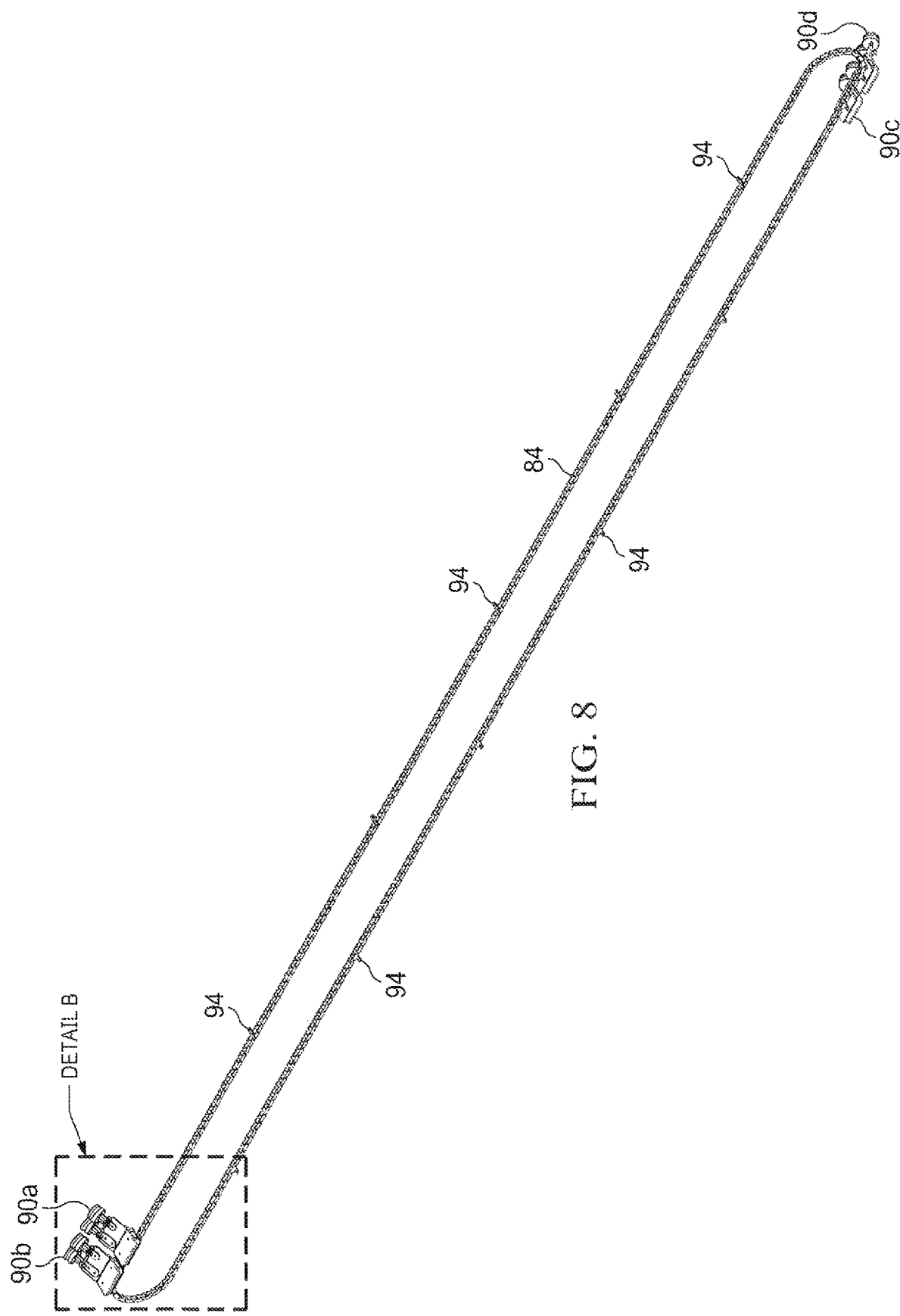
FIG. 8 shows a transfer chain 84 for an embodiment 30a or 30b of a line transfer assembly used in the inventive stringing apparatus 2.

As illustrated in FIGS. 5-7, each of the line measuring and cutting assemblies 26 used in the inventive stringing apparatus 2 preferably comprises a housing 38 having a right hand feeding and cutting assembly 40a and a left hand feeding and cutting assembly 40b installed therein. Each of the feeding and cutting assemblies 40a and 40b preferably comprises: a drive wheel or roller 44; an idler wheel or roller 46 adjacent to the drive wheel or roller 44; a hydraulic, electric, pneumatic or other motor 45 for turning the drive wheel or roller 44; a pivotable clamping arm 48 on, in, or against which the idler wheel or roller 46 is rotatably mounted; and a pulling nip 50 formed between the drive wheel (or roller) 44 and the idler wheel (or roller) 46 for receiving the line 10 from a supply spool 25a or 25b and delivering the line 10 through the line measuring and cutting assembly 26.

Each of the right hand and left hand feeding and cutting assemblies 40a and 40b within the housing 38 also comprises: a lower guide tube 52 which extends upwardly from a line inlet opening 54a or 54b in the bottom wall 56 of the housing 38 for guiding the line 10 received from one of the line supply spools 25a or 25b into the nip 50 between the pulling wheel 44 and the idler wheel 46; an upper guide tube 56 which extends upwardly from the nip 50 to guide the line 10 discharged from the wheels or rollers 44 and 46 through a line discharge opening 55a or 55b in the top wall 58 of the housing 38; a knife 60 positioned above the wheels or rollers 44 and 46 for cutting the line 10 to provide the line segments 10a and 10c or 10b and 10d of desired length for stringing and staking; a hydraulic piston, electric piston, pneumatic piston or other actuator 62 for inserting the knife 60 into and retracting the knife 60 from a break or gap 64 in the upper guide tube 56 for cutting the line 10; and an adjustment knob 66, which is threadedly or otherwise connected to an adjustment member 68 which extends from the upper end of the pivotable clamping arm 48 for the idler wheel or roller 46. By turning the adjustment knob 66, the amount of gripping force applied to the line 10 in the pulling nip 50 between the drive wheel 44 and the idler wheel 46 can be increased or decreased as needed for pulling the line 10 through the system.

The idler wheel or roller 46 used in each of the right hand and left hand feeding and cutting assemblies 40a and 40b within the housing 38 preferably includes an encoder 69 for determining when a set, predetermined length of the line 10 for any of the stringing segments 10a, 10b, 10c, or 10d has been delivered through the line measuring and cutting assembly 26. When the set length of line for segment 10a, 10b, 10c, or 10d has been measured by the encoder 69, the motor 45 which turns the drive wheel or roller 44 is automatically stopped and the knife 60 is automatically actuated for cutting the segment 10a, 10b, 10c, or 10d.

The control system 70 for automatically stopping the drive wheel motor 45 and actuating the knife 60, based upon the measurement information provided by the encoder 69, will preferably be, or include, a microprocessor having input and output ports as well as a communication network or link. The control system 70 will preferably be located within the housing 38 of the line measuring and cutting assembly 26.

By way of example, but not by way of limitation, the drive and idler wheels or rollers 44 and 46 used in the line measuring and cutting assembly 26 can be metallic, rubber, plastic, smooth or textured. Also, although the knife 60 used in the inventive stringing apparatus 2 has been shown and described as being a single edged knife which is operated by a linear actuator, the knife 60 can alternatively be a double edged knife for cutting in two directions, or can be a rotary blade which is operated using a rotary actuator such as a rotary solenoid.

In the method of the present invention, as each worker 18 on the worker platform structure 16 approaches a first lateral overhead trellis cable 72 (see FIG. 14) which is located just ahead of (preferably from about 3 to about 4 feet ahead of) a hop mound 6, approximately one foot of line 10 will be projecting from each of the right hand and left hand line discharge openings 55a and 55b provided on the top of the housing 38. When the worker 18 reaches the overhead trellis cable 72, the worker 18 will (a) press or strike a right trigger switch 74 provided on the top of the housing 38 and grasp the line 10 projecting from the right end of the housing 38 with her right hand, (b) simultaneously press or strike a left trigger switch 78 provided on the top of the housing 38 and grasp the line 10 projecting from the left end of the housing 38 with her left hand, and (c) tie the upper ends of the lines 10 to the first overhead trellis cable 72 such that one line 10 is tied to the right of the hop mound 6 and the other line 10 is tied to the left of the hop mound 6 (see FIG. 14).

The trigger switches 74 and 78 which were activated by the worker 18 are electronically linked to the inputs of the control system 70 so that, while the worker 18 is tying the upper ends of the lines 10 to the first overhead trellis cable 72, the control system 70 will automatically activate the drive wheel motors 45 and the knives 60 of the right and left hand feeding and cutting assemblies 40a and 40b within the housing 38 to feed out, measure, and cut the desired length of each line 10 on each side of the line measuring and cutting assembly 26 to form the first right hand stringing segment 10a and the first left hand stringing segment 10c for the hop mound 6. The worker 18 will then clip the right and left hand stringing segments 10a and 10c, which are now hanging from the overhead trellis cable 72, into the right and left hand line transfer assemblies 30a and 30b provided on either side of the worker 18 so that the line transfer assemblies 30a and 30b will later carry the lower ends of the hanging right and left hand bine support line segments 10a and 10c down to the line staking assembly 32 provided for the worker 18 at the back end on the trailer 14.

After cutting the line segments 10a and 10c, the control system 70 will activate the drive wheel motors 45 of the measuring and cutting assembly 26 to again feed out approximately one foot of line 10 from each of the right hand and left hand line discharge openings 55a and 55b provided on the top of the housing 38. Next, as the worker 18 approaches a second lateral overhead trellis cable 76 which is located just after (preferably from about 3 to about 4 feet after) the same hop mound 6, the worker 18 will again press or strike the trigger switches 74 and 78 provided on the top of the housing 38 and will (a) grasp the projecting line 10 on the right with her right hand, (b) simultaneously grasp the projecting line 10 on the left with her left hand, and (c) tie the upper ends of the lines 10 to the second overhead trellis cable 76 such that one line 10 is tied to the right of the hop mound 6 and the other line 10 is tied to the left of the hop mound 6.

While the worker 18 is tying the upper ends of the lines 10 to the second overhead trellis cable 76, the control system 70 software will automatically activate the drive wheel motors 45 and the knives 60 of the right and left hand feeding and cutting assemblies 40a and 40b within the housing 38 to feed out, measure, and cut the desired length of each line 10 on each side of the line measuring and cutting assembly 26 to form the second right hand stringing segment 10b and the second left hand stringing segment 10d for the hop mound 6. The worker 18 will then clip the second pair of stringing segments 10b and 10d, which are now hanging from the overhead trellis cable 76, into the right and left hand line transfer assemblies 30a and 30b provided on either side of the worker 18 so that the line transfer assemblies 30a and 30b will later carry the lower ends of the second pair of bine support line segments 10b and 10d down to the line staking assembly 32 along with the first pair of bine support line segments 10a and 10c.

The program software of the control system 70 also counts the number of times that the trigger switches 74 and 78 have been pressed and when the desired number of lines 10 for the mound 6 have been measure and cut, the controller 70 will activate the right and left hand line transfer assemblies 30a and 30b on either side of the worker 18 to carry the lower ends of the bine support line segments 10a, 10b, 10c, and 10d to the line staking assembly 32.

Each line measuring and cutting assembly 26 also preferably includes a keypad 80, provided on the housing 38, which is electronically linked to the controller 70 for (i) toggling the power to the system for manually advancing the line feeding and cutting assemblies 40a and 40b and (ii) manually advancing the line transfer assemblies 30a and 30b. Also, an emergency stop button 82 is provided on the housing 38 which is electronically linked to controller 70 for quickly cutting off the power to all active components.

The segments of bine support line 10a, 10b, 10c, and 10d can be cut to any length necessary such that the upper ends of the line segments 10a, 10b, 10c, and 10d can be tied or otherwise connected the overhead trellis network 12 and the lower ends of the line segments 10a, 10b, 10c, and 10d can be staked in the ground or otherwise secured at, below, or above ground level adjacent to the hop mounds 6. The length of the line segments 10a, 10b, 10c, and 10d will preferably be in the range of from about 18 to about 22 feet and will typically be about 20 feet.

For each worker 18, each of the right hand and the left hand line transfer assemblies 30a and 30b preferably comprises a transfer chain 84 which extends downwardly at an angle from (a) a drive sprocket 86 which is positioned above the back end of the worker platform structure 16 to (b) an idler sprocket 88 which is positioned at the back end of the trailer 14 adjacent to the line staking assembly 32 provided for the worker 18. (See FIGS. 8-12). The drive sprocket 86 and the idler sprocket 88 are mounted on the ends of an elongate frame structure 97 of the line transfer assembly 30a or 30b.

Each line transfer assembly 30a and 30b further comprises: a first pair of line clip assemblies 90 and 90b which are attached to the transfer chain 84 at the upper end of the assembly 30a or 30b such that the clip assemblies 90a and 90b project inwardly toward the worker 18; a second pair of line clip assemblies 90c and 90d which are attached to the transfer chain 84 at the lower end of the assembly 30a or 30b such that the clip assemblies 90c and 90d project inwardly toward the staking assembly 32; a hydraulic, electric, or pneumatic motor 95 mounted at the upper end of the assembly 30a or 30b for driving the drive sprocket 86; a plurality of chain slide tabs 94 which are attached at spaced intervals along the transfer chain 84; an elongate cover 96 attached over the transfer chain 84; and a plurality of chain guides 98, mounted in and/or on the elongate frame 97, through which the chain slide tabs 94, as well as carriage slide plates 100 provided in the clip assemblies 90a, 90b, 90c, and 90d, slide for guiding the transfer chain 84 and the clip assemblies 90a, 90b, 90c, and 90d along an elongate continuous transfer and return path from the worker platform structure 16 to the line staking assembly 32, and then back again.

Figure 10:
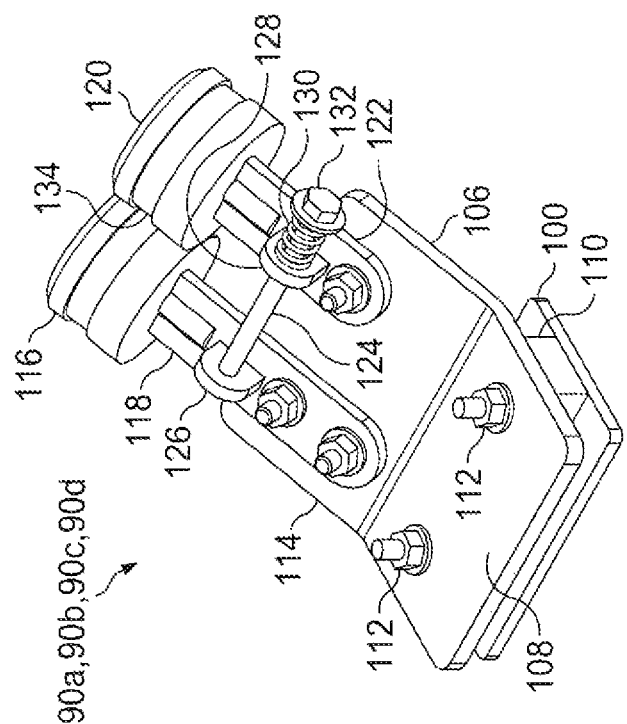
FIG. 10 is a perspective view of a clip assembly 90a, 90b, 90c, or 90d used in the line transfer assembly 30a or 30b.
Figure 9:
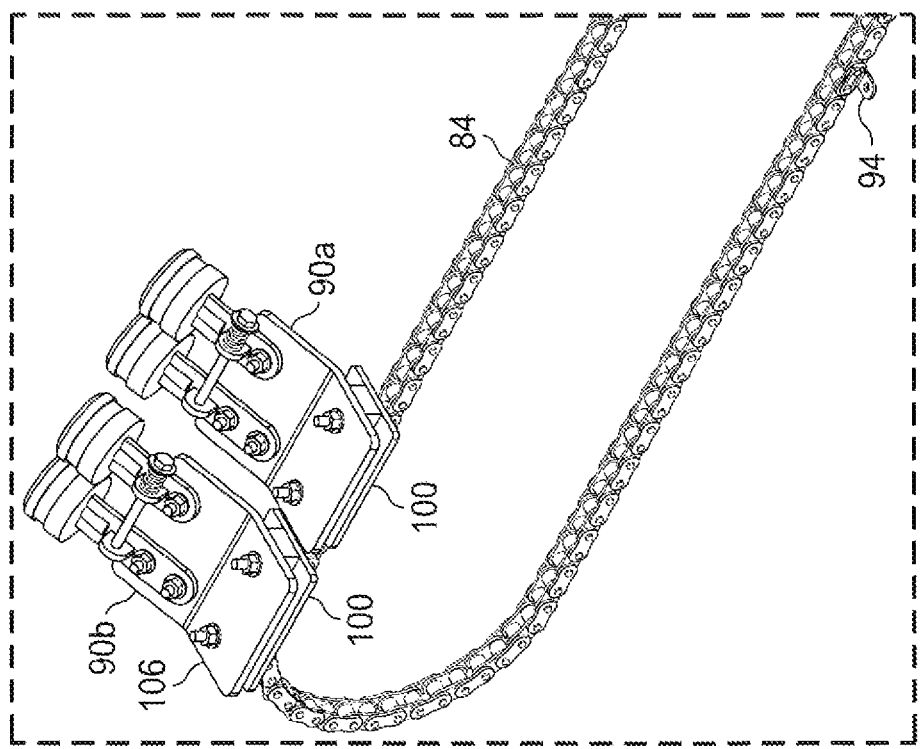
FIG. 9 is an enlarged view of Detail B shown in FIG. 8.
Figure 11:
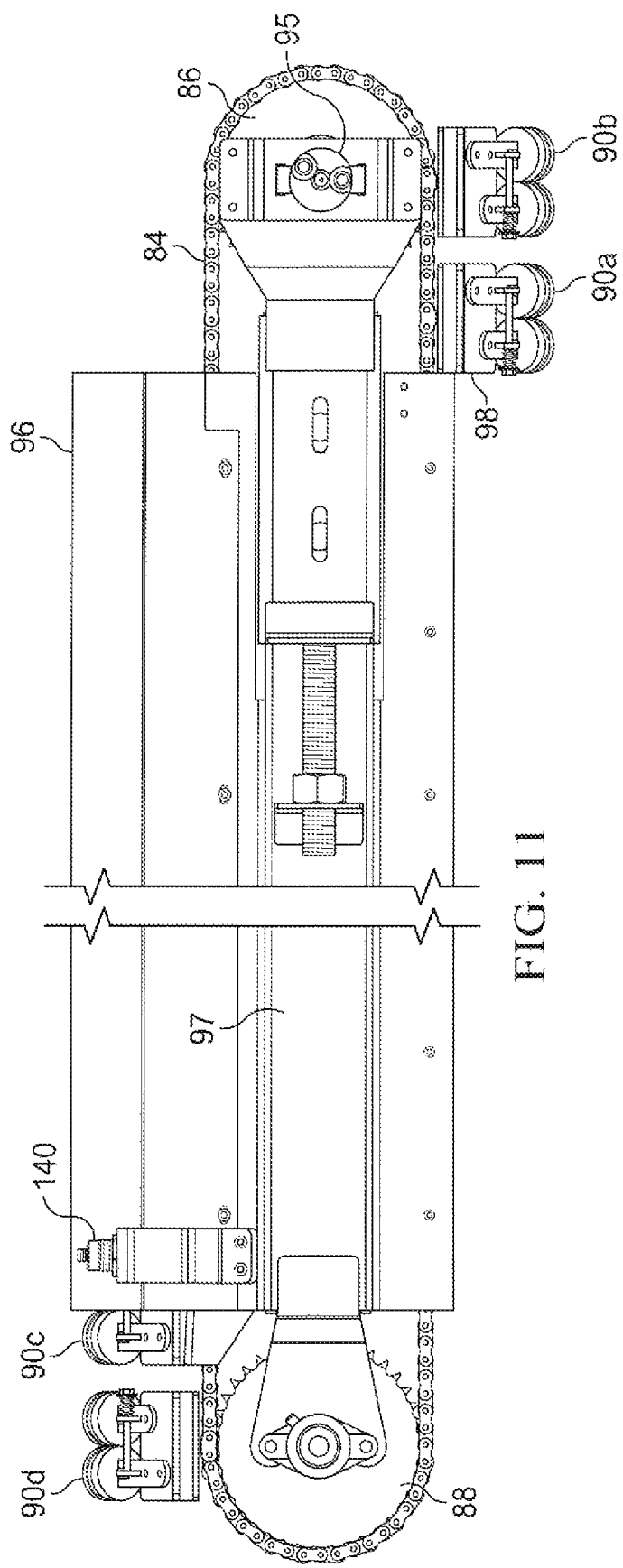
FIG. 11 is an elevational side view of the line transfer assembly 30a or 30b.
Figure 12:
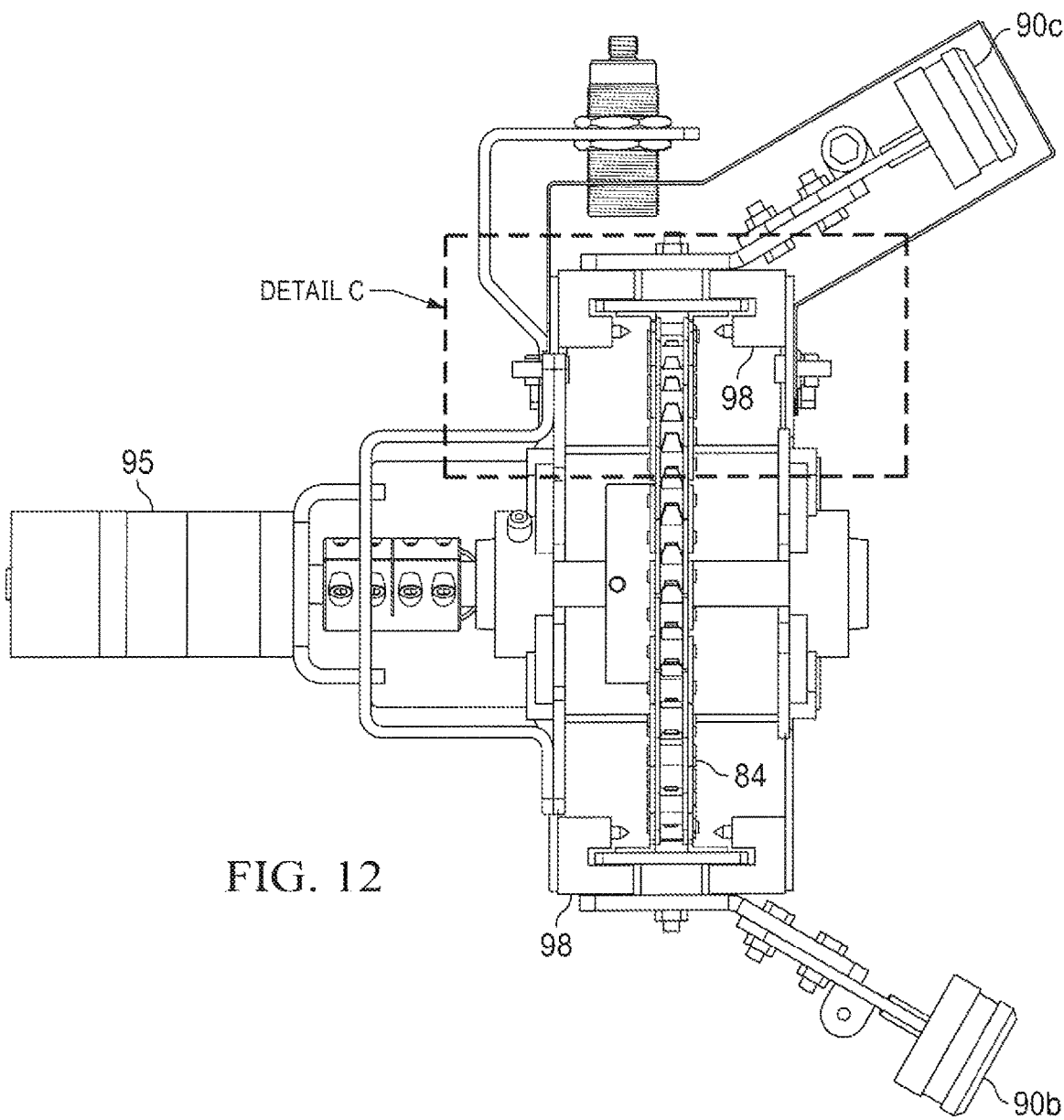
FIG. 12 is an elevational end view of the line transfer assembly 30a or 30b.
Figure 13:
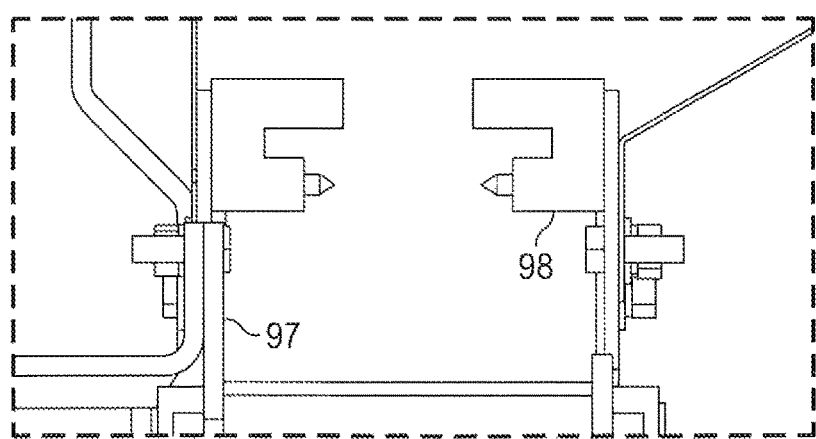
FIG. 13 is an enlarged simplified view of Detail C shown in FIG. 12.

As illustrated in FIG. 10, each of the line clip assemblies 90a, 90b, 90c, and 90d preferably comprises: a carriage bracket 106 having an attachment section 108 which is positioned above the carriage slide plate 100 and is spaced apart from the carriage slide plate 100 by a narrow spacer 110; a pair of bolts 112 which extend through the carriage bracket 106, the spacer 110 and the carriage slide plate 100 for attaching the clip assembly 90a, 90b, 90c, or 90d to the transfer chain 84; an outer section 114 of the carriage bracket 106 which projects outwardly at an angle from the attachment section 108 of the bracket 106; a first clip roller 116 which is secured to the outer section 114 of the carriage bracket 106 in fixed position by a fixed support arm 118; a second clip roller 120 which is positioned adjacent to the first clip roller 116 and is pivotably secured to the outer section 114 of the carriage bracket 106 by a pivotable support arm 122; and an adjustment bolt 124 which extends through both a tab 126 provided on the fixed support arm 118 of the roller 116 and a tab 128 provided on the pivotable support arm 122 of the roller 120.

The angle and the projecting length of the outer section 114 of the carriage bracket 106, as well as the projecting lengths of the roller support arms 118 and 122, will be as needed for properly delivering the lower ends of the bine support line 10a, 10b, 10c, and 10d to the line staking assembly 32 in a manner which will be more fully discussed below.

To maintain an appropriate amount of line tension while transferring the lower ends of the line segments 10a, 10b, 10, and 10d to the staking assembly 32, a compression spring 130 is provided on the adjustment bolt 124 between the head 132 of the bolt 124 and the tab 128 of the pivotable support arm 122 so that the bolt 124 can be used to tighten or loosen the line receiving (clipping) nip 134 which is formed between the rollers 116 and 120. The rollers 116 and 120 may be rotatably or non-rotatably mounted. By way of example, but not by way of limitation, the rollers 116 and 120 can be formed of plastic, rubber, or metal and can have smooth or textured contacting surfaces. The rollers 116 and 120 can be sized for receiving a single line 10 therebetween or multiple lines.

It will also be understood that other types of clips can be used in the line transfer assemblies 30a and 30b and that, rather than using a transfer chain 84, a belt, cable, or other type of carrier can be used. In addition, rather than cycling the line clip assemblies 90a, 90b, 90c, and 90d around a continuous loop, each of the line transfer assemblies 30a and 30b can alternatively be constructed to instead convey the desired number of line clip assemblies 90a, 90b, 90c, and/or 90d in two directions along a linear path between the worker platform structure 16 and the line staking assembly 32.

The upwardly extending supports 136 and 138 which hold each of the line transfer assemblies 30a and 30b in its angled, upwardly extending operating position are preferably adjustable to allow the transfer line assemblies 30a and 30b to be lowered to a substantially horizontal position for transport between locations. It will be understood, however, that the structures 136 and 138 shown in the drawings serve as examples of suitable support structures and that other types or forms of supports can alternatively be used for accomplishing these purposes.

Figure 14:
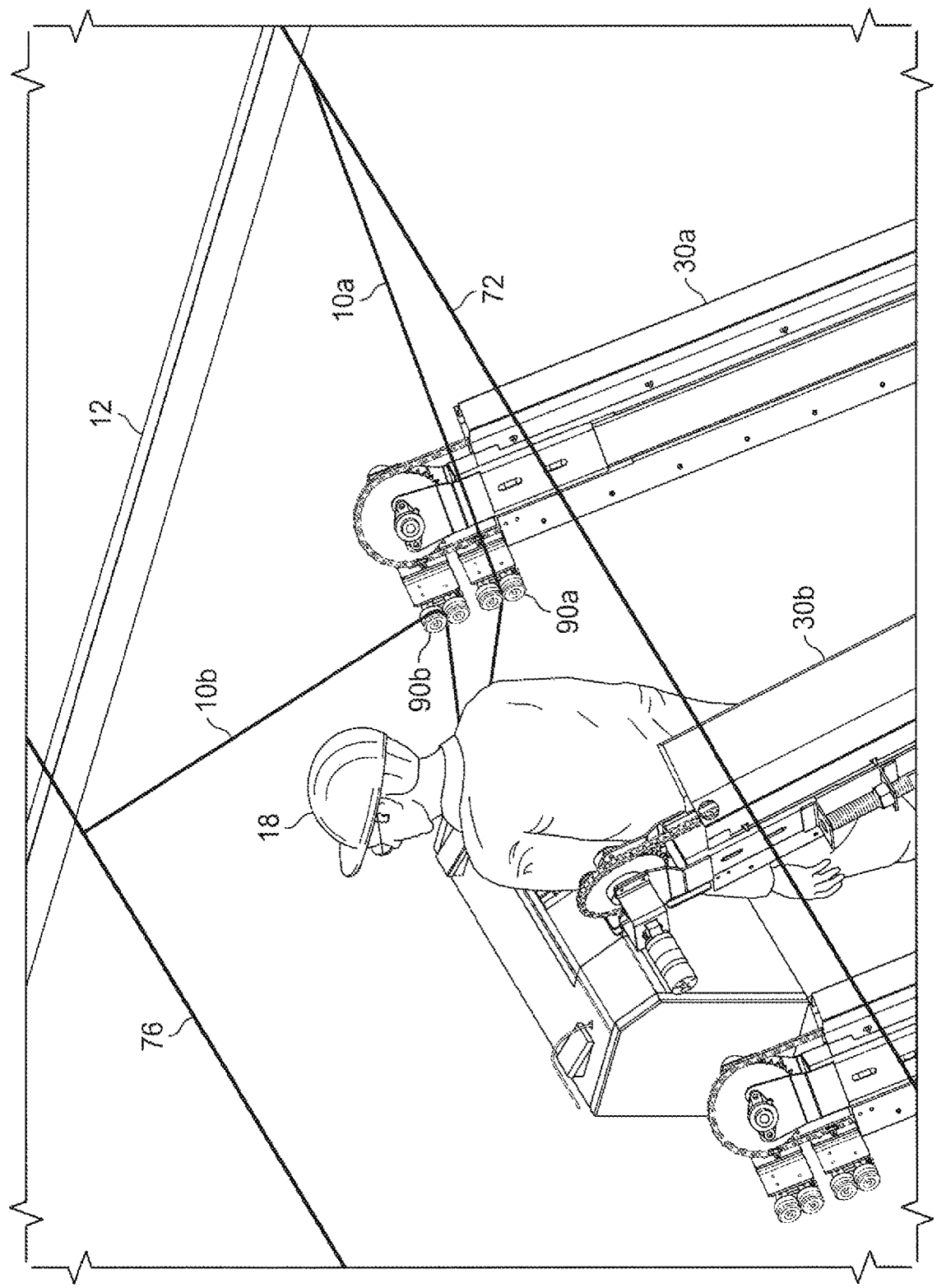
FIG. 14 illustrates the tying of successive right hand bine support lines 10a and 10b to successive overhead trellis cables 72 and 76, and the clipping of the line segments 10a and 10b into clip assemblies 90a and 90b of the right hand line transfer assembly 30a for a worker 18.
Figure 15:
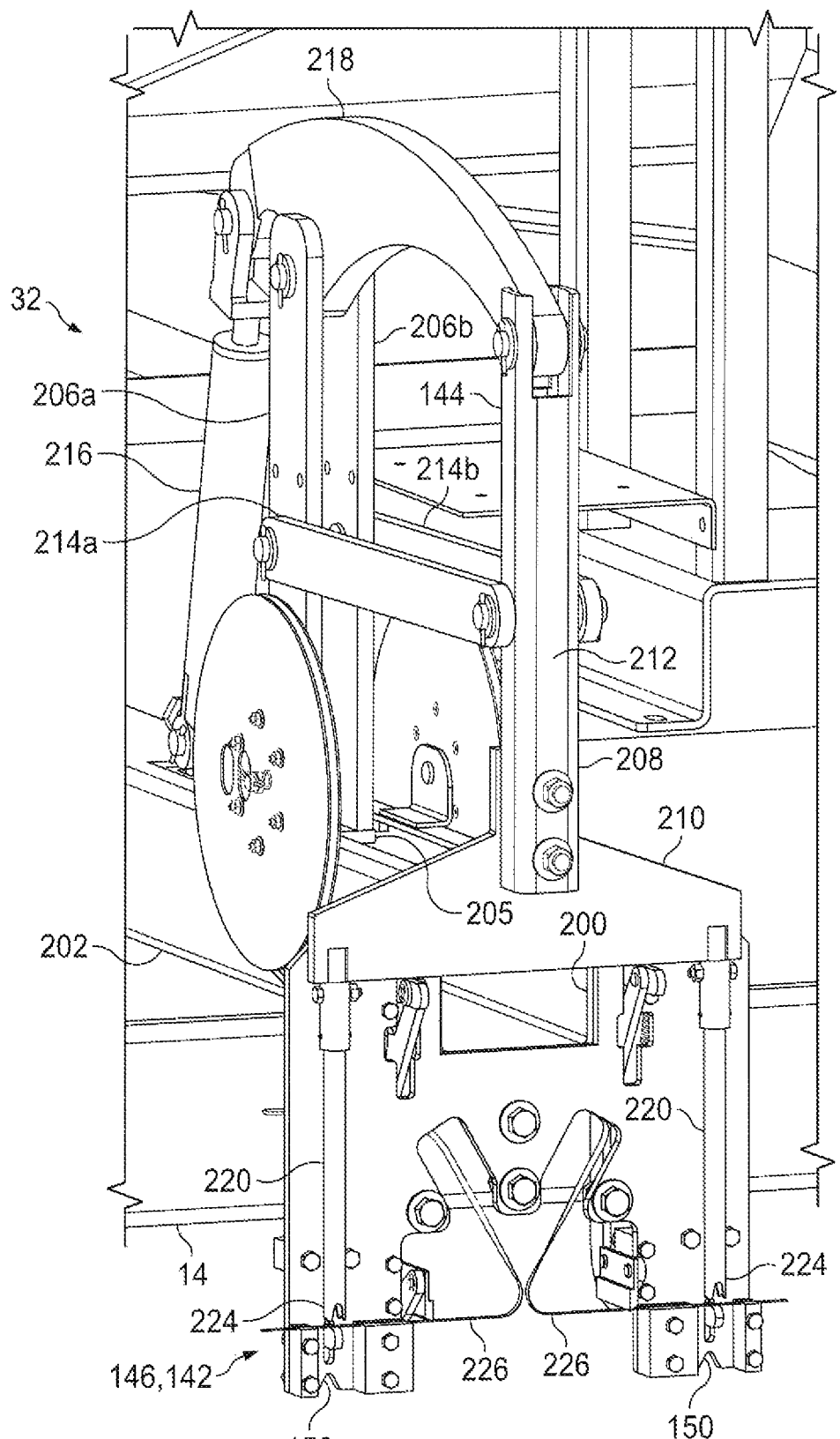
FIG. 15 is a perspective view of a portion of an embodiment 32 of a line staking assembly used in the inventive stringing apparatus 2.
Figure 16:
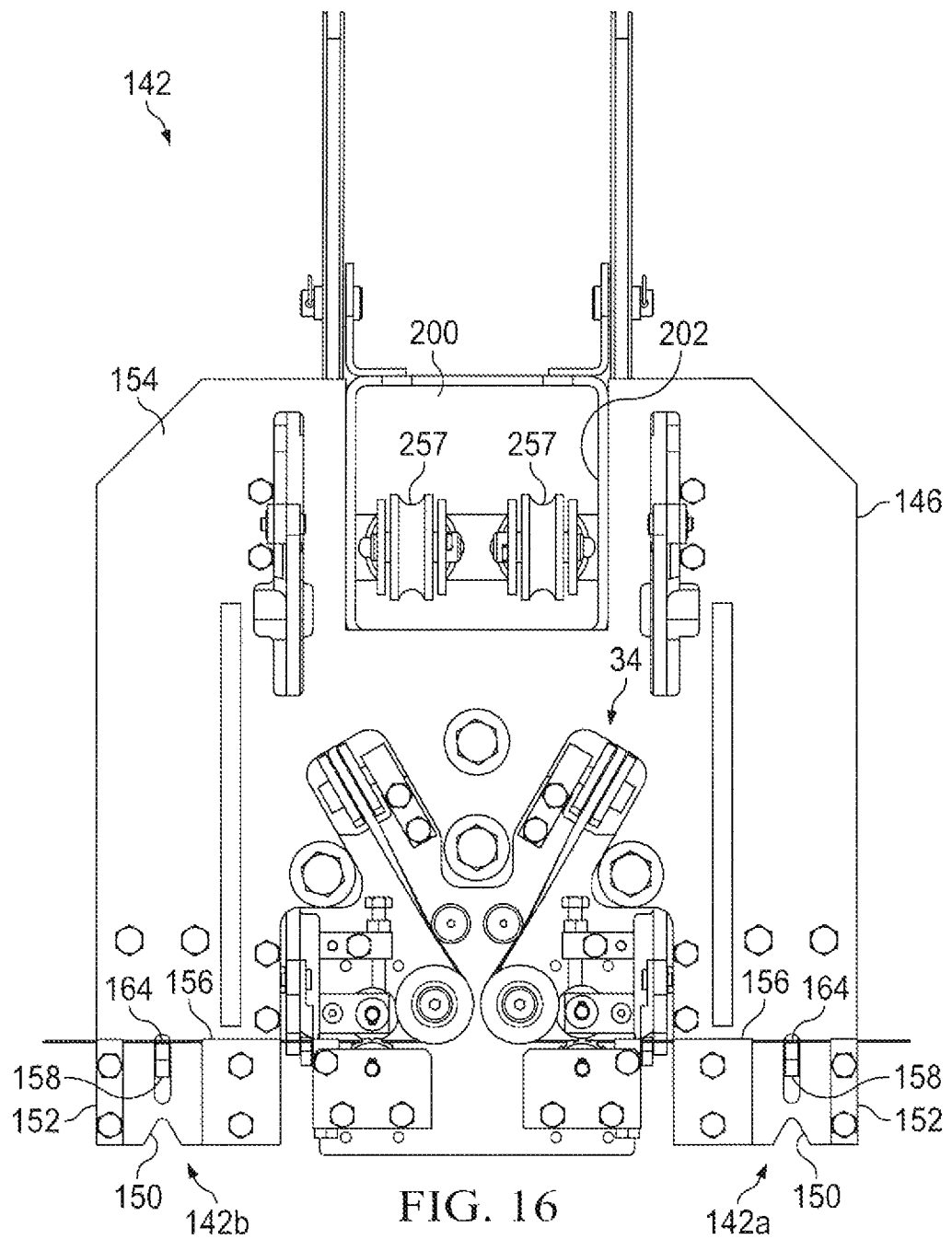
FIG. 16 is an elevational side view of a portion of the line staking assembly 32.
Figure 17:
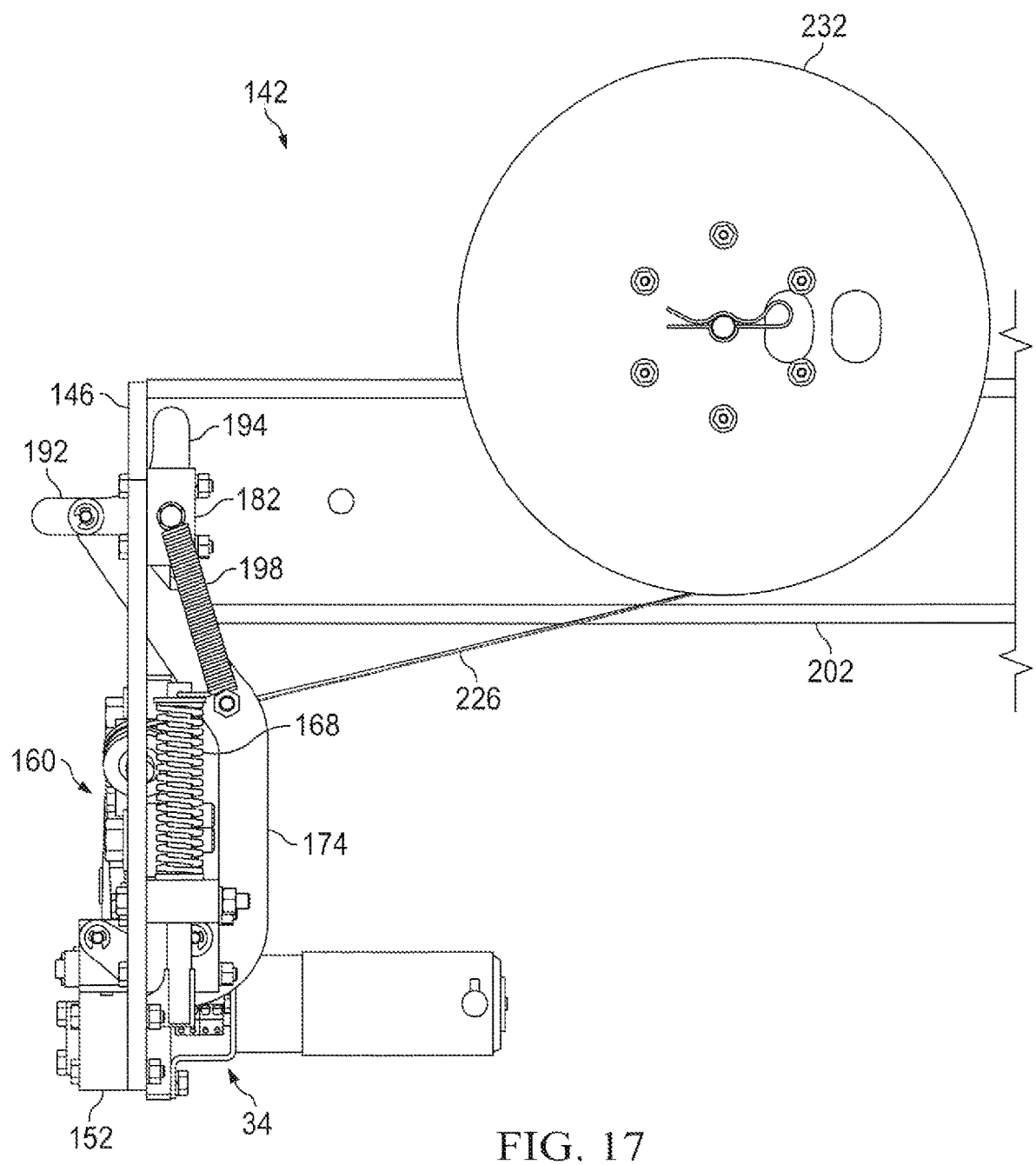
FIG. 17 is an elevational side view of the portion of the line staking assembly 32 shown in FIG. 16.
Figure 18:
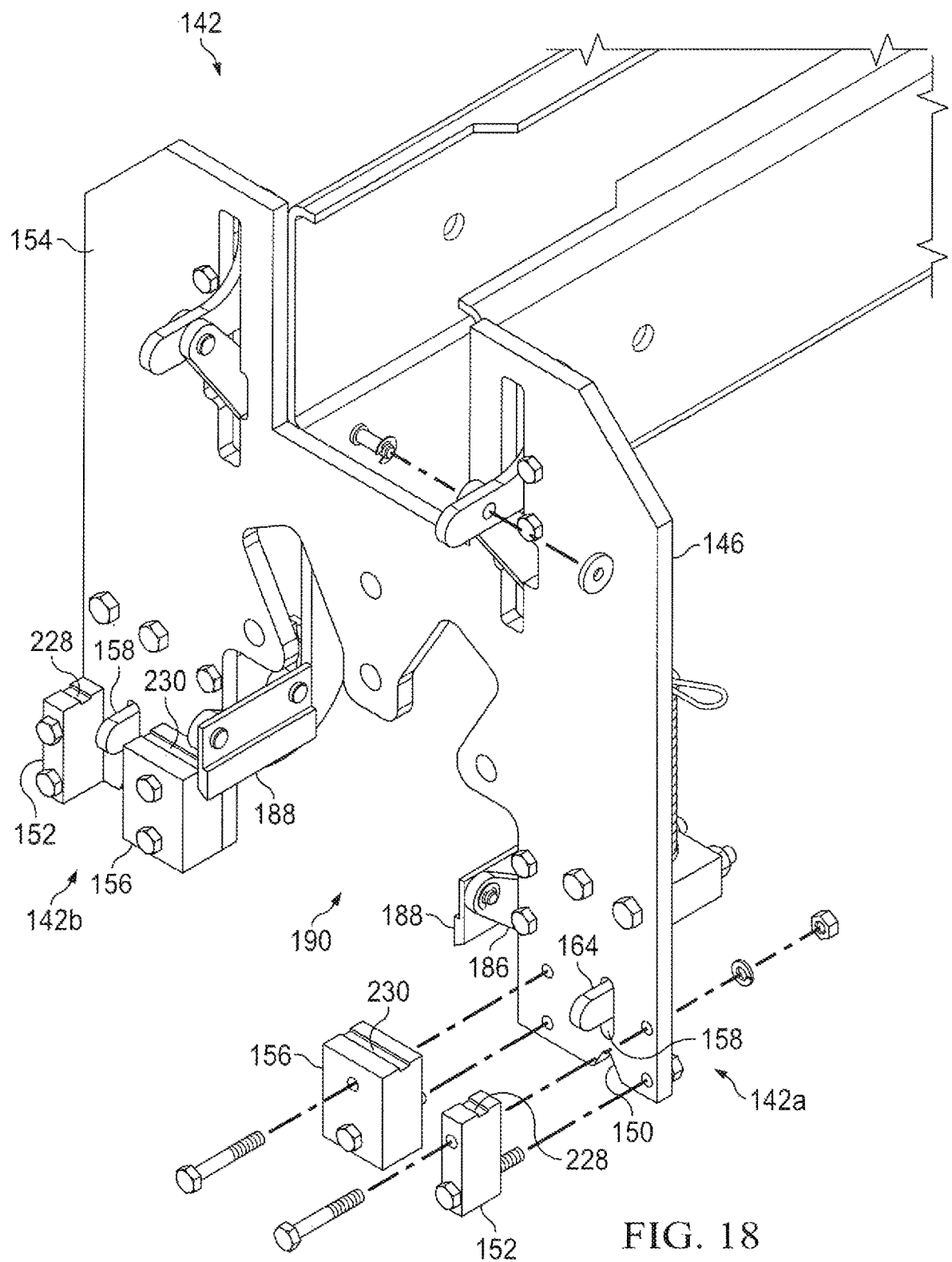
FIG. 18 is a partially exploded front perspective view of the anchor forming assembly 142.
Figure 19:
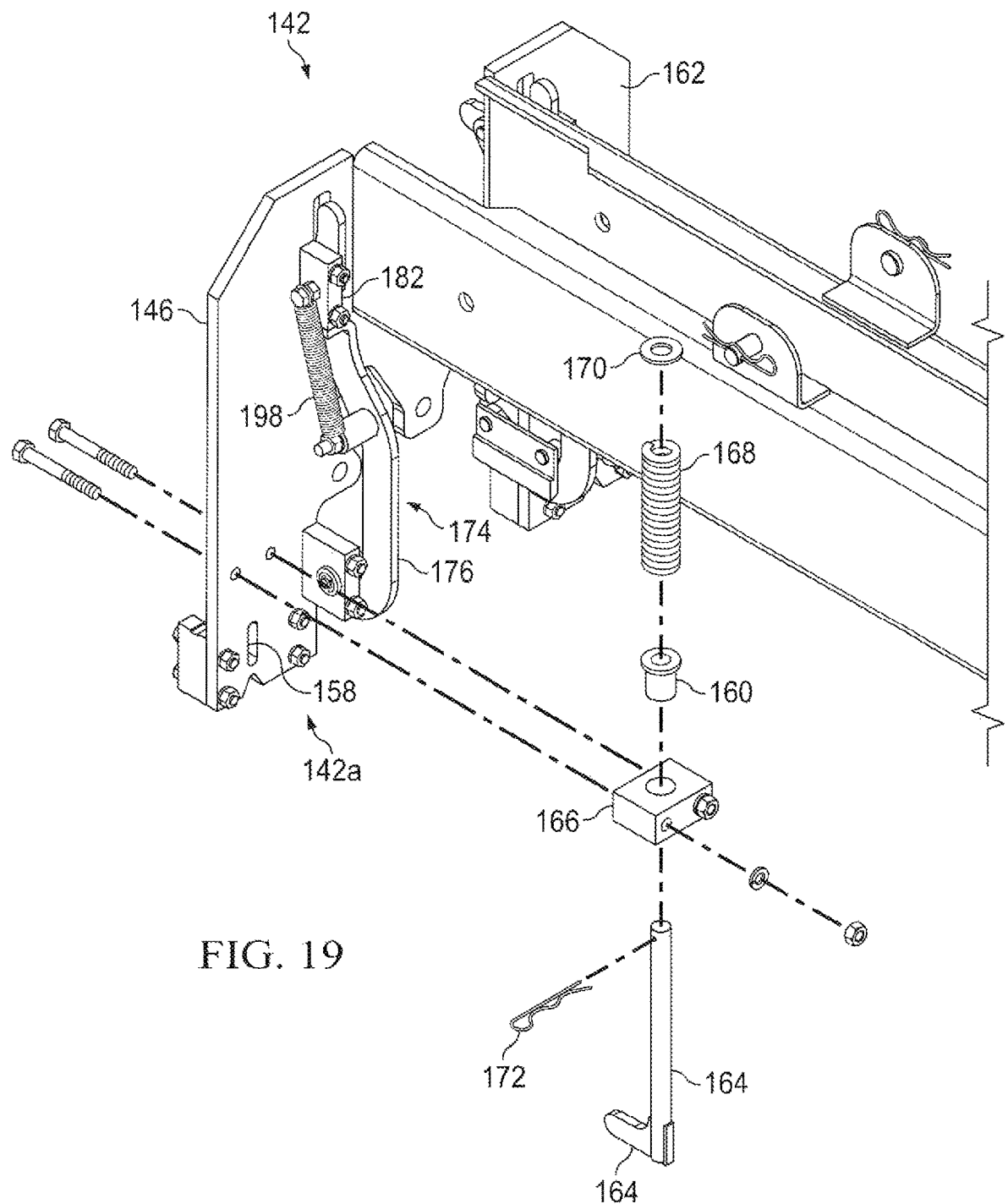
FIG. 19 is a partially exploded rear perspective view of the anchor forming assembly 142.
Figure 20:
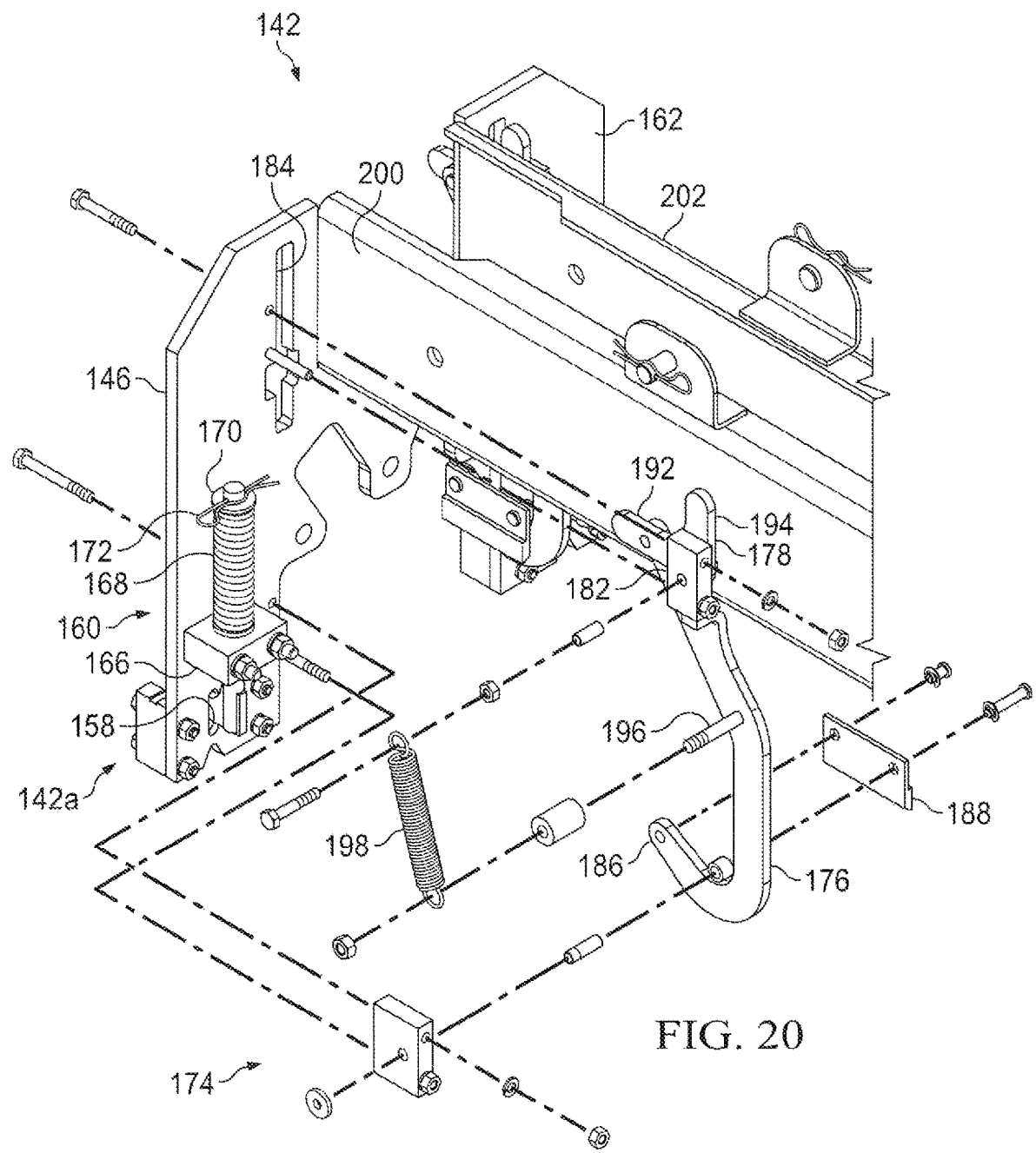
FIG. 20 is another partially exploded rear perspective view of the anchor forming assembly 142.
Figure 21A:
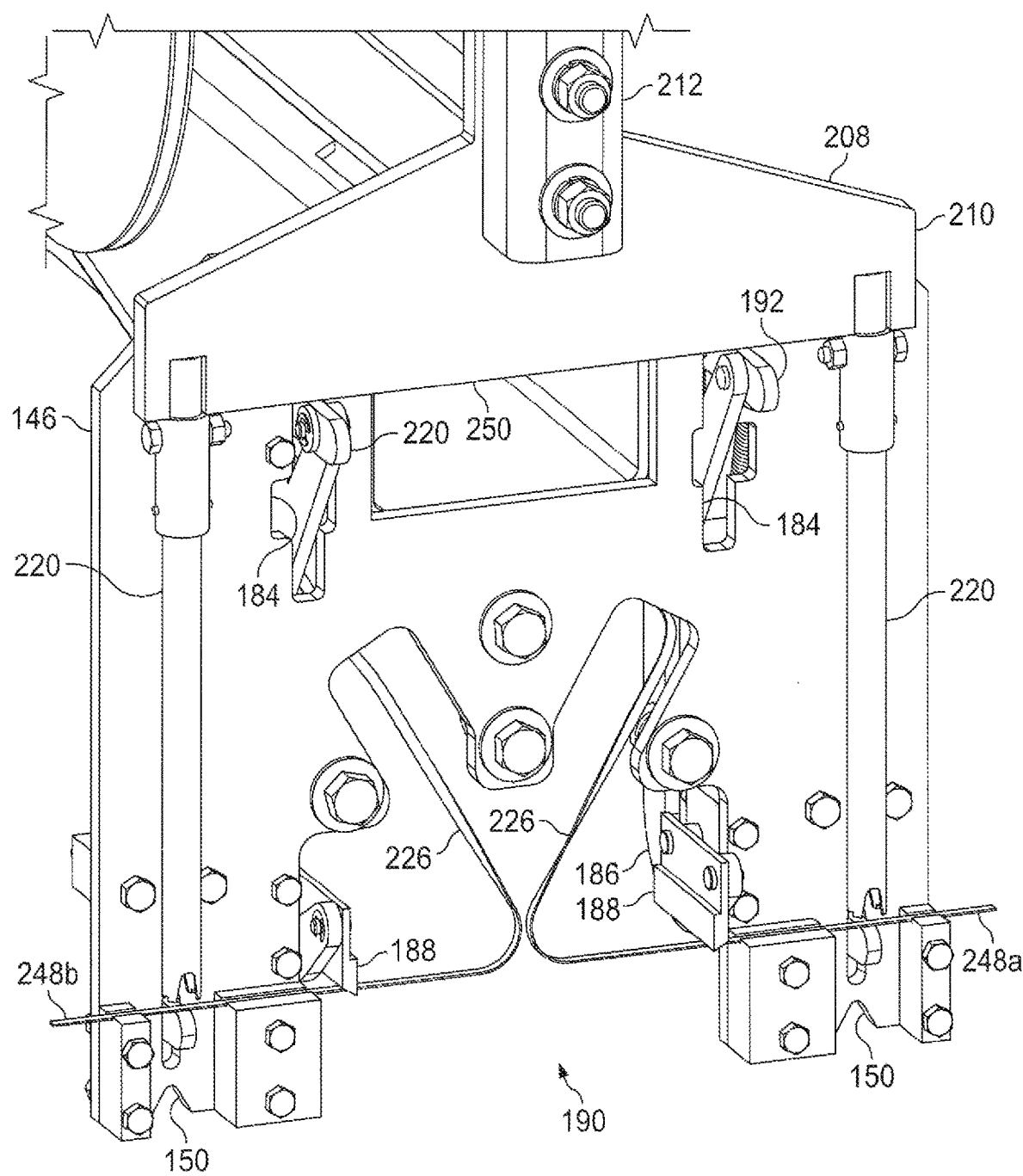
FIGS. 21A, 21B, 21C, and 21D are sequential drawings illustrating the operation of the anchor forming assembly 142 and the staking plunger assembly 144 to form a staking anchor 248b.
Figure 21B:
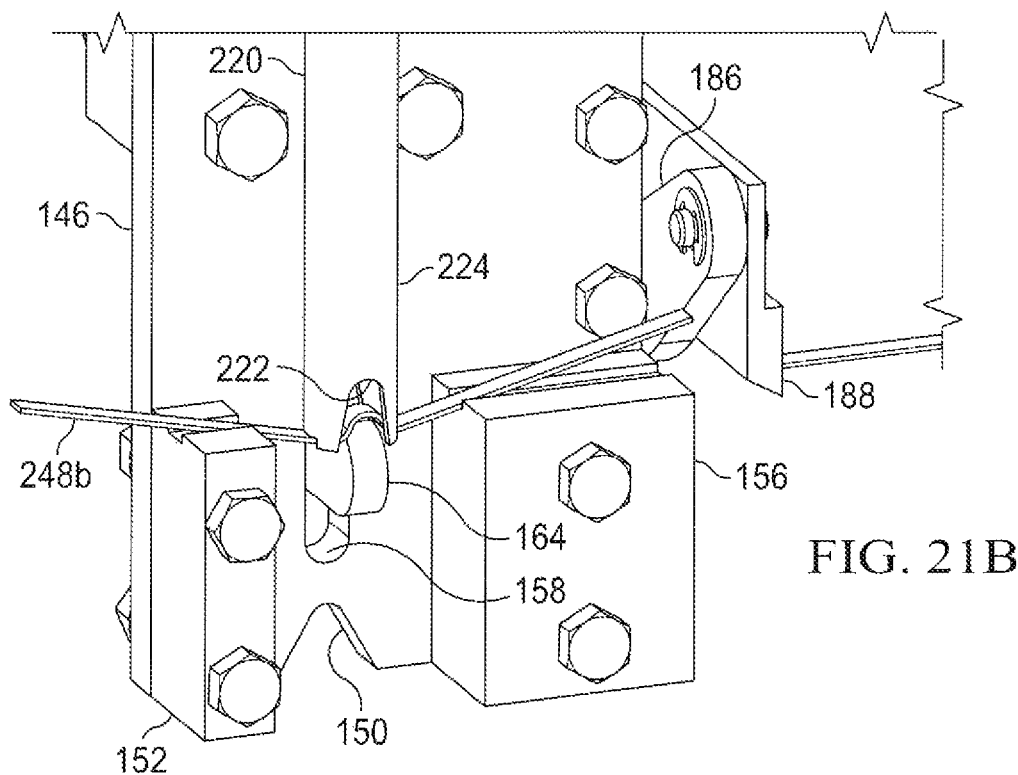
Figure 21C:
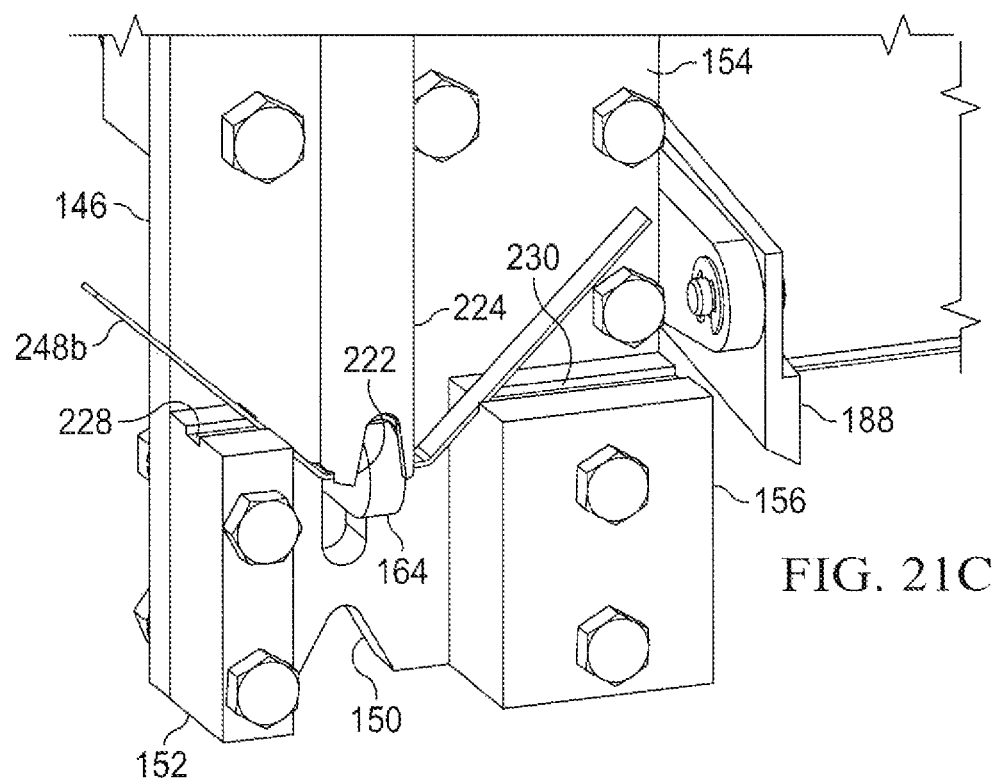
Figure 21D:
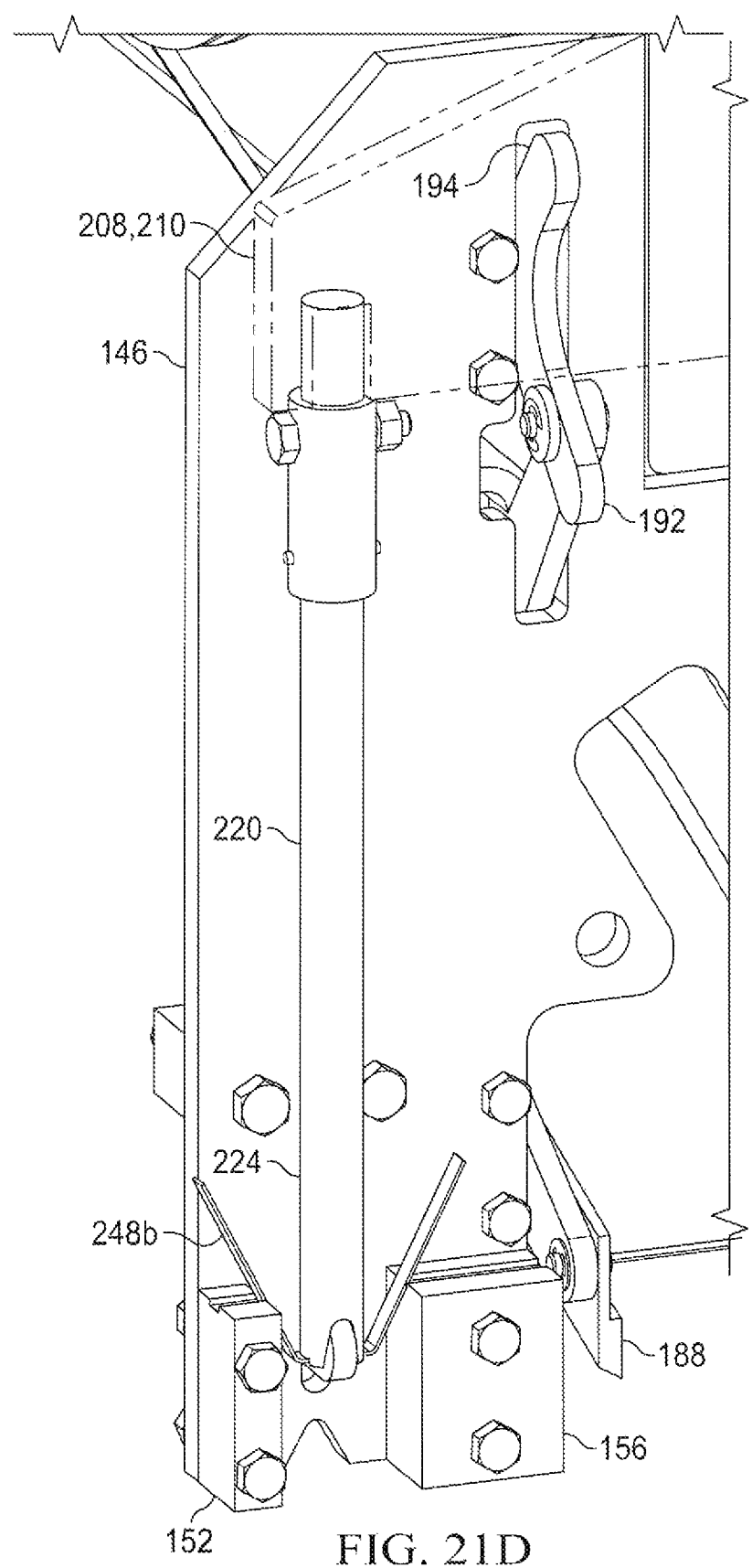

In accordance with the method of the present invention, and as illustrated for the right hand line transfer assembly 30a in FIG. 14, after the worker 18 has tied the upper ends of the first pair of right and left hand line segments 10a and 10e to the first overhead trellis cable 72 as described above, the worker 18 will (a) clip the right hand line 10a between the rollers 116 and 120 of the line clip assembly 90a at the top end of the right hand line transfer assembly 30a and (b) clip the left hand line 10e between the rollers 116 and 120 of the corresponding line clip assembly 90a at the top end of the left hand line transfer assembly 30b.

Next, after the worker 18 has tied the upper ends of the second pair of right and left hand line segments 10b and 10d to the second overhead trellis cable 76 as described above, the worker 18 will (a) clip the right hand line 10b between the rollers 116 and 120 of the line clip assembly 90b located adjacent to clip assembly 90a at the top end of the right hand line transfer assembly 30a and (b) clip the left hand line 10d between the rollers 116 and 120 of the corresponding line clip assembly 90b at the top end of the left hand line transfer assembly 30b.

When the controller 70 determines that the worker 18 has pressed each of the trigger switches 74 and 78 twice so that all of the right hand and left hand stringing segments 10a, 10b, 10c, and 10d desired for the mound 6 have been measured and cut, the controller 70 will automatically activate the drive motors 95 of the transfer chains 84 of the right and left hand transfer assemblies 30a and 30b to run the clip assemblies 90a and 90b of each transfer assembly 30a and 30b to the lower ends of the assemblies 30a and 30b, thus delivering the lower ends of the line segments 10a, 10b, 10c, and 10d to the line staking assembly 32.

For each of the line transfer assemblies 30a and 30b, at the same time that the first pair of line clip assemblies 90a and 90b are rotated by the transfer chain 84 to the bottom of the transfer assembly 30a or 30b, the transfer chain 84 rotates the second pair of line clip assemblies 90c and 90d to the top of the transfer assembly 30a or 30b for use in stringing the next hop mound 6. Also, for each of the line transfer assemblies 30a and 30b, a proximity switch 140 is preferably mounted on or at the lower end of each of the line transfer assemblies 30a or 30b to detect the arrival of the first pair of clip assemblies 90a and 90b, or the second pair of clip assemblies 90c and 90d, and stop the transfer chain 84 when each pair has arrived at its appropriate ready position at the top end of the transfer assembly 30a or 30b or has arrived at its appropriate delivery position at the bottom end of the transfer assembly 30a or 30b. The proximity switch 140 will preferably be an electrical, non-contact switch which triggers on metal surfaces, but could alternatively be, for example, an optical proximity switch, a mechanical contact switch, or other type of sensor.

As noted above, one line staking assembly 32 for each worker 18 is mounted at the back end of the trailer 14. As illustrated in FIGS. 3 and 15-21D, each of the line staking assemblies 32 preferably comprises: an anchor forming assembly 142; a wire feeding assembly 34 for the anchor forming assembly 142; and a staking plunger assembly 144 for staking the lower ends of the bine support lines 10a, 10b, 10c, and 10d into the ground 254 adjacent to the hop mound 6.

Each anchor forming assembly 142 is a symmetrical assembly having (a) a right half 142a, which operates on a right half of a vertical base plate 146, for receiving the lower ends of the lines 10a and 10c from the right hand transfer assembly 30a and forming a staking anchor 248a for the right hand lines 10a and 10c and (b) left half 142b, provided on the left half of the vertical base plate 146, for receiving the lower ends of the lines 10b and 10d from the left hand transfer assembly 30b and forming a staking anchor 248b for the left hand lines 10b and 10d.

Each half 142a and 142b of the anchor forming assembly 142 preferably comprises: a line receiving notch 150 formed in the bottom of the vertical base plate 146; an outer anchor forming block 152 on the front face 154 of the vertical base plate 146 adjacent to an outer side of the line receiving notch 150; an inner anchor forming block 156 on the front face 154 of the vertical base plate 146 adjacent to an inner side of the line receiving notch 150; a vertical slot 158 formed through the vertical base plate 146 above the notch 150 and between the anchor forming blocks 152 and 156; and a spring loaded bending foot assembly 160 which is installed on the back 162 of the vertical base plate 146 and has a wire bending foot 164 which projects forwardly through the vertical slot 158 of the base plate 146 between the anchor forming blocks 152 and 156.

The wire bending foot 164 of the spring loaded bending foot assembly 161 projects radially outward from the bottom end of a vertical rod 164. The spring loaded bending foot assembly 160 further comprises: a bushing block 166, attached to the back side of the vertical base plate 146, through which the vertical rod 164 extends; and a spring 168 which is retained around the upper portion of the rod 164 between the bushing block 166 and a washer 170 and cotter pin 172 on the upper end of the rod 164.

Each half 142a and 142b of the anchor forming assembly 142 preferably also includes an anchor cutting assembly 174 comprising a spring loaded cutting arm 176 having an upper end portion 178 which is pivotably mounted on an inner side of a pivot block 182 attached to the upper portion of the back side 162 of the vertical base plate 146. The pivot block 182 is adjacent to an upper vertical slot 184 formed through the base plate 146.

The spring loaded anchor cutting arm 176 also has: a hooked lower end 186 having a blade 188 attached thereto such that the blade 188 projects through a central bottom opening 190 of the vertical base plate 146 adjacent to and inside of the inner anchor forming block 156; a cutting lever 192 which projects forwardly from the upper end portion of the spring loaded cutting arm 176 through the upper vertical slot 184 formed through the base plate 146; a plunger engaging lever 194 which projects upwardly from the upper end of the spring loaded cutting arm 176, preferably at an angle of approximately 90° with respect to the cutting lever 192; and a spring mounting post 196 which projects laterally outward from the side of the spring loaded cutting arm 176.

The anchor cutting assembly 174 further comprises a biasing spring 198 having (a) and upper end which is secured to the outer side of the pivot block 182 and (b) a lower end which is secured on the spring mounting post 196 of the cutting arm 176. The biasing spring 198 biases the cutting arm 176 toward a forward ready position in which (1) the cutting lever 192 projects through the upper vertical slot 184 formed through the base plate 146 and (2) the anchor cutting blade 188 projects through the vertical base plate 146 at an elevation which is higher than the inner anchor forming block 156.

In each of the anchor forming assemblies 142, the vertical base plate 146 of the anchor forming assembly 142 is attached in fixed position on the open outer end 200 of a plunger slide channel 202 for the staking plunger assembly 144. The vertical base plate 146 has a cutout in the top thereof for the open outer end 200 of the plunger slide channel 202 so that the open outer end 200 of the plunger slide channel 202 is not blocked by the vertical base plate 146.

As illustrated in FIGS. 15-21D, the staking plunger assembly 144 comprises: (i) a sliding base structure 205 which comprises an I-beam segment or other sliding base element 204 which is slideably received in the plunger slide channel 202 and an opposing pair of parallel base bracket plates 206a and 206b which extend upwardly from the sliding base element 204; (ii) a staking plunger 208 comprising a lower rod plate 210 and an elongate bar or tube 212 which extends vertically upward from the rod plate 210; (iii) an opposing pair of plunger support arms 214a and 214b which each have a first end which is pivotably attached to one of the base bracket plates 206a or 206b and a second end which is pivotably attached to the vertical plunger bar or tube 212 between the upper and lower ends thereof; (iv) a hydraulic, electric, or pneumatic piston 216 having a lower end which is secured between the bottom portions of the base bracket plates 206a and 206b; (v) a plunger operating linkage structure 218 which is attached between the upper end of the hydraulic, electric, or pneumatic piston and the upper end of the vertical plunger bar or tube 212 such that the piston 216 and the linkage 218 will operate, together with the plunger support arms 214a and 214b, to lower and lift the staking plunger 208 in a straight up and down plunging motion; and (vi) a pair of staking rods 220 (i.e., one staking rod 220 for each half 142a and 142b of the anchor forming assembly 142) which extend vertically downward from the outer lateral end portions of the lower rod plate 210 of the staking plunger 208. The staking rods 220 may be permanently or removably attached to the lower rod plate 210.

Each staking rod 220 has an inverted U-shaped or inverted V-shaped groove 222 which extends upwardly into the bottom end 224 of the staking rod 220. In the initial ready position of the staking plunger assembly 144 (illustrated in FIG. 15), the sliding base element 204 of the staking plunger assembly 144 is retracted in the plunger slide channel 202 such that (a) the lower rod plate 210 of the plunger 208 and the staking rods 220 extending downwardly therefrom are closely adjacent to or touching the front face 154 of vertical base plate 146 of the anchor forming assembly 142 and (b) the bottom ends 224 of the staking rods 220 are positioned above the wire bending feet 164 which project from the face 154 of the vertical base plate 146 for each half 142a and 142b of the anchor forming assembly 142.

The anchor wire feeding assembly 34 used for each of the anchor forming assemblies 142 can be any mechanism which is capable of feeding a wire 226 to each half 142a and 142b of the anchor forming assembly 142 such that, in each half 142a and 142b, the wire 226 will be delivered through and rest in the co-linear grooves 228 and 230 formed in the tops of the outer and inner anchor forming blocks 152 and 156 on the front face 154 of the vertical base plate 146.

By way of example, an embodiment of the inventive wire feeding assembly 34 which is illustrated in FIGS. 23-26 has a right half 34a for feeding a wire 226 to the right half 142a of the anchor forming assembly 142 and an identical left half 34h for feeding a wire 226 to the left half 142b of the anchor forming assembly 142. For each half 34a and 34b, the wire feeding assembly 34 comprises: a wire supply spool 232 which is rotatably attached to the outer side of the plunger slide channel 202; a vertical wire feed base plate 234; an upper grooved idler roller 236 rotatably secured on the upper portion of the wire feed base plate 234 such that the wire 226 traveling over the idler roller 236 will be pulled in a forward direction; and a lower grooved idler roller 238 which is laterally rotatably mounted on the face of the wire feed base plate 234 such that, as the wire 226 is pulled from the upper roller 236 under the lower lateral roller 238, the lower roller 238 will direct the wire 226 in an outward lateral direction.

Each half 34a and 34b of the wire feeding assembly 34 further comprises: a drive roller 240 and an opposing idler roller 242 which are rotatably mounted on the wire feed base plate 234; a hydraulic, electric, pneumatic or other motor 235 for turning the drive roller 240; a wire guide block 244 which is secured against the wire feed base plate 234 at the outer discharge side of the opposing drive and idler rollers 240 and 242; and a laterally extending groove 246 which is formed in the top of the wire guide block 244 and is in alignment with the co-linear grooves 228 and 230 formed in the tops of the outer and inner anchor forming blocks 152 and 156 on the front face 154 of the vertical base plate 146.

Consequently, for each half 34a and 34b of the wire feeding assembly 34, as the drive roller 240 is rotated by the motor 235, the wire 226 from the wire supply spool 232 is pulled forwardly over the upper idler roller 236, then laterally outward under the lower idler roller 238, and is then discharged from between the drive roller 240 and idler roller 242 into the upper lateral groove 246 of the wire guide block 244, which in turn guides the wire 226 into the co-linear grooves 228 and 230 formed in the tops of the outer and inner anchor forming blocks 152 and 156 on the front face 154 of the vertical base plate 146 of the anchor forming assembly 142. Also, for each side 34a and 34b of the wire feeding assembly 34, a proximity switch is provided at the outer edge of the base plate 146 to detect the delivery of a predetermined length of wire 226 for forming and cutting the staking anchor 248a or 248b for staking the lower ends of the right hand bine support line segments 10a or 10b and the lower ends of the left hand bine support line segments 10c and 10d into the ground 254.

Figure 22A:
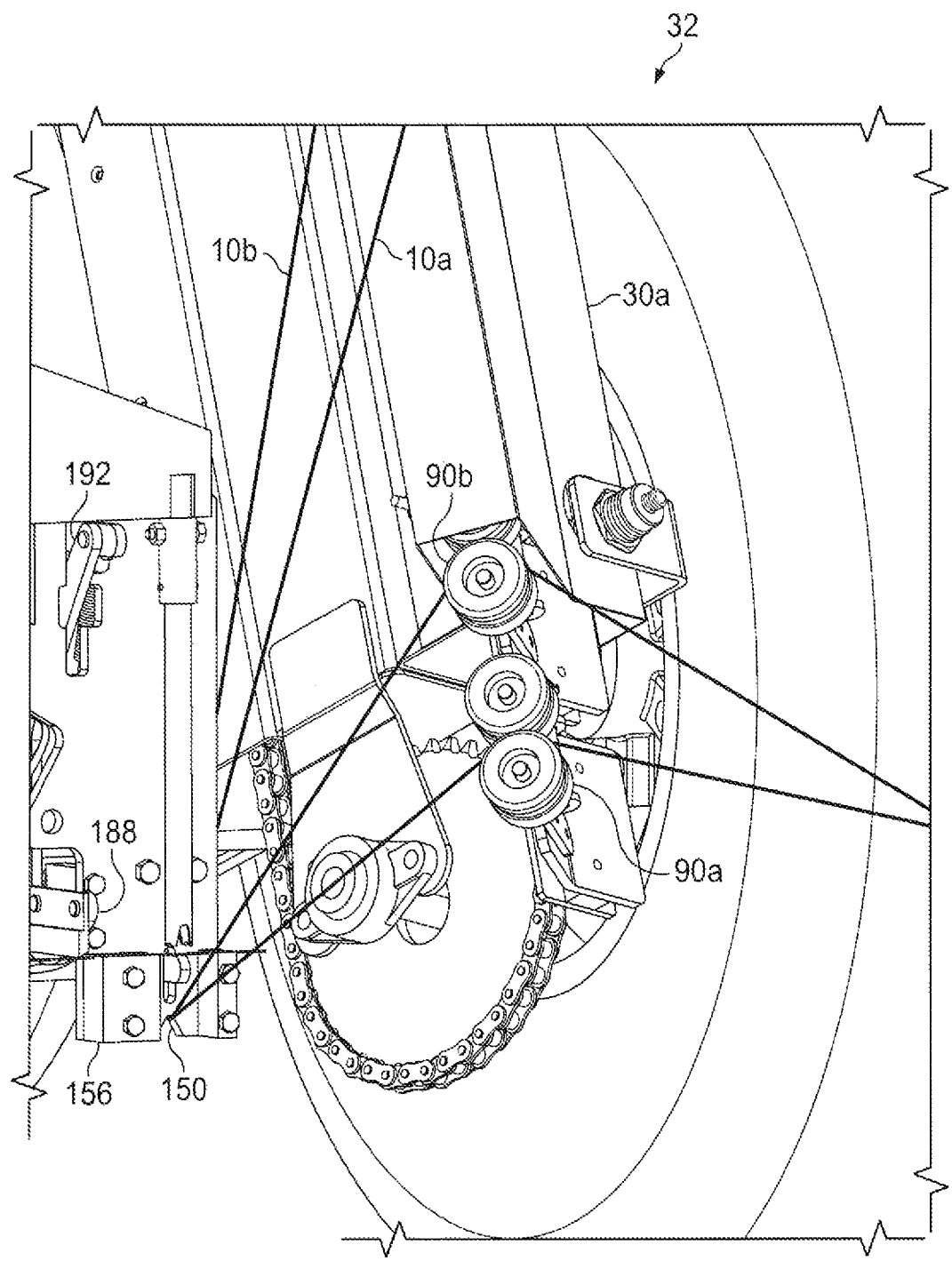
FIGS. 22A, 22B, and 22C are sequential drawings illustrating the operation of the staking plunger assembly 144 to stake the lower ends of bine support lines 10a, 10b, 10c, and 10d in the ground 254 adjacent to a hop mound 6.

As illustrated in FIG. 22A, in accordance with the method of the present invention, as the pair of clip assemblies 90a and 90b of the right hand line transfer assembly 30a approach their bottom stop position, the clip assemblies 90a and 90b wrap the lower ends of the right hand bine support lines 10a and 10b into the line receiving notch 150 formed in the bottom of the right hand half of the vertical base plate 146 of the anchor forming assembly 142. At the same time, the clip assemblies 90a and 90b of the left hand line transfer assembly 30b wrap the lower ends of the left hand bine support lines 10c and 10d into the line receiving notch 150 formed in the bottom of the left hand half of the vertical base plate 146 of the anchor forming assembly 142. The lower ends of the lines 10a, 10b, 10c, and 10d are retained in the notches 150 until the line staking assembly reaches the hop mound 6.

When the hop mound 6 is reached, the control system 70 automatically (a) receives a plunge signal from a GPS system (discussed below), or other mound locating system, indicating that the mound 6 has been reached and then (b) activates the hydraulic, electric, or pneumatic piston 216 of the plunger assembly 114 to drive the staking plunger 208 downward. As is sequentially illustrated in FIGS. 21A-21D, as the staking plunger 208 is forced downward, a bottom edge 250 of the lower rod plate 210 contacts the cutting levers 192 of the anchor cutting assemblies 174 on the right and left halves 142a and 142b of the anchor forming assembly 142, thus pushing the cutting levers 192 downward and simultaneously causing the anchor cutting blades 188 on each half of the assembly to cut the measured segments of wire 226 needed for forming a right side staking anchor 248a for the right hand lines 10a and 10b and a left side staking anchor 248b for the left hand lines 10e and 10d.

Subsequently, for each half 142a and 142b of the anchor forming assembly 142, as the staking plunger 208 continues its downward motion, the bottom 224 end of the staking rod 220 for each half 142a or 142b of the anchor forming assembly 142 contacts the wire segment for the anchor 248a or 248b such that the wire bends around the wire bending foot 164 beneath the rod 220 and the bent central portion of the wire and the wire bending foot 164 are eventually received in the bottom groove 222 of the rod 220. At the same time that the rod 220 pushes the central portion of the wire downward, the contact between the outer ends of the wire and the outer and inner anchor forming blocks 152 and 156 bends the outer ends of the wire upward such that the resulting staking anchor 248a or 248b has a W shape.

Next, as the staking rods 220 for each half 142a and 142b of the anchor assembly 142 are forced further downward, the plunger engaging levers 194 of the anchor cutting assemblies 174 are also forced to pivot downwardly, through the upper vertical slot 184 of the base plate 146 of the anchor forming assembly 142, and into contact with the back side of the lower rod plate 210 of the staking plunger 208, thus pushing the staking plunger 208 and causing the staking plunger assembly 144 to slide outward. The outward movement of the staking plunger 208, assisted by a vertical deflection of the spring loaded bending feet 164, releases the wire bending feet 164 from the grooves 222 in the bottoms of the staking rods 220 and allows the anchor wires to slide off of the feet 164.

Figure 22B:
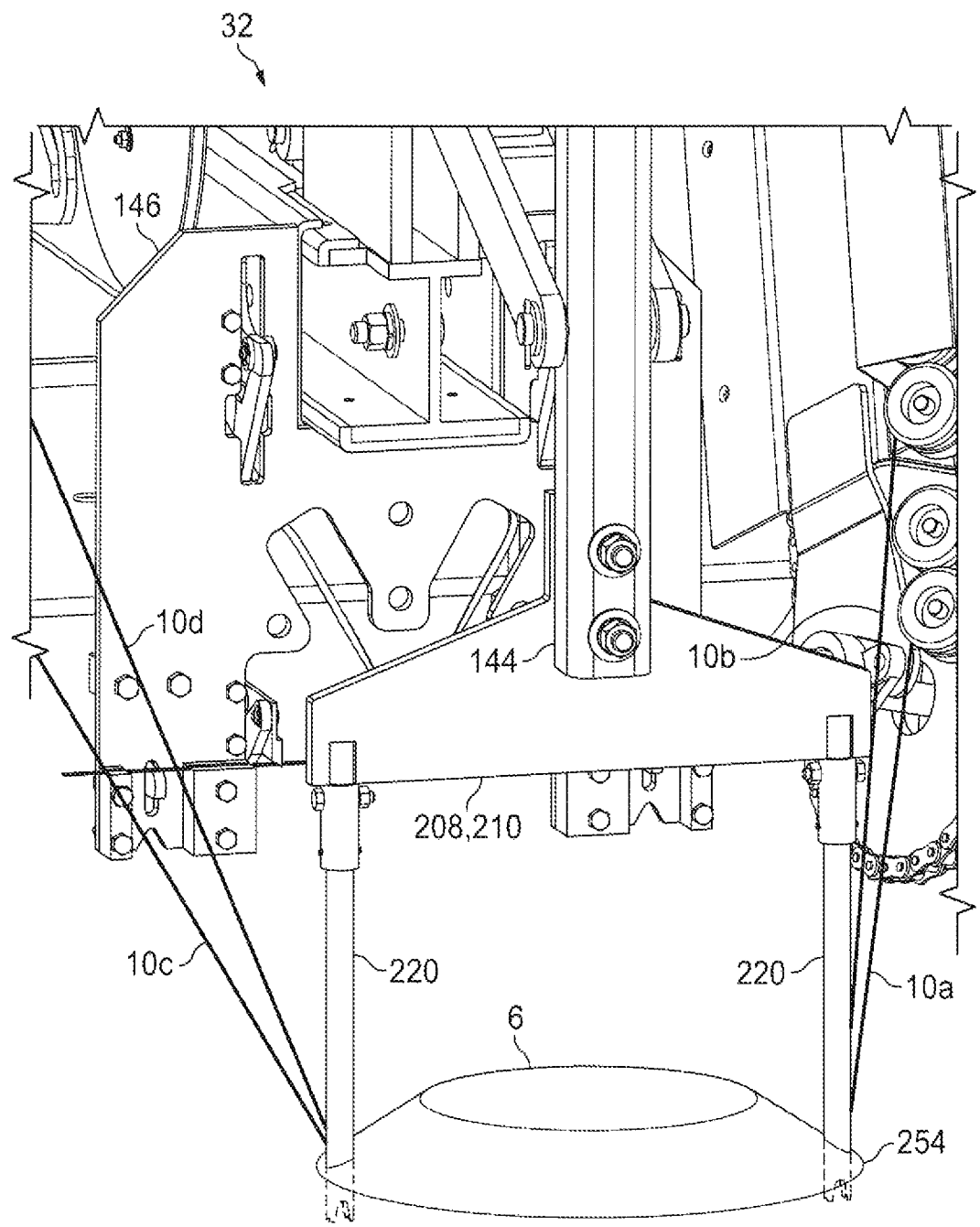
Figure 22C:
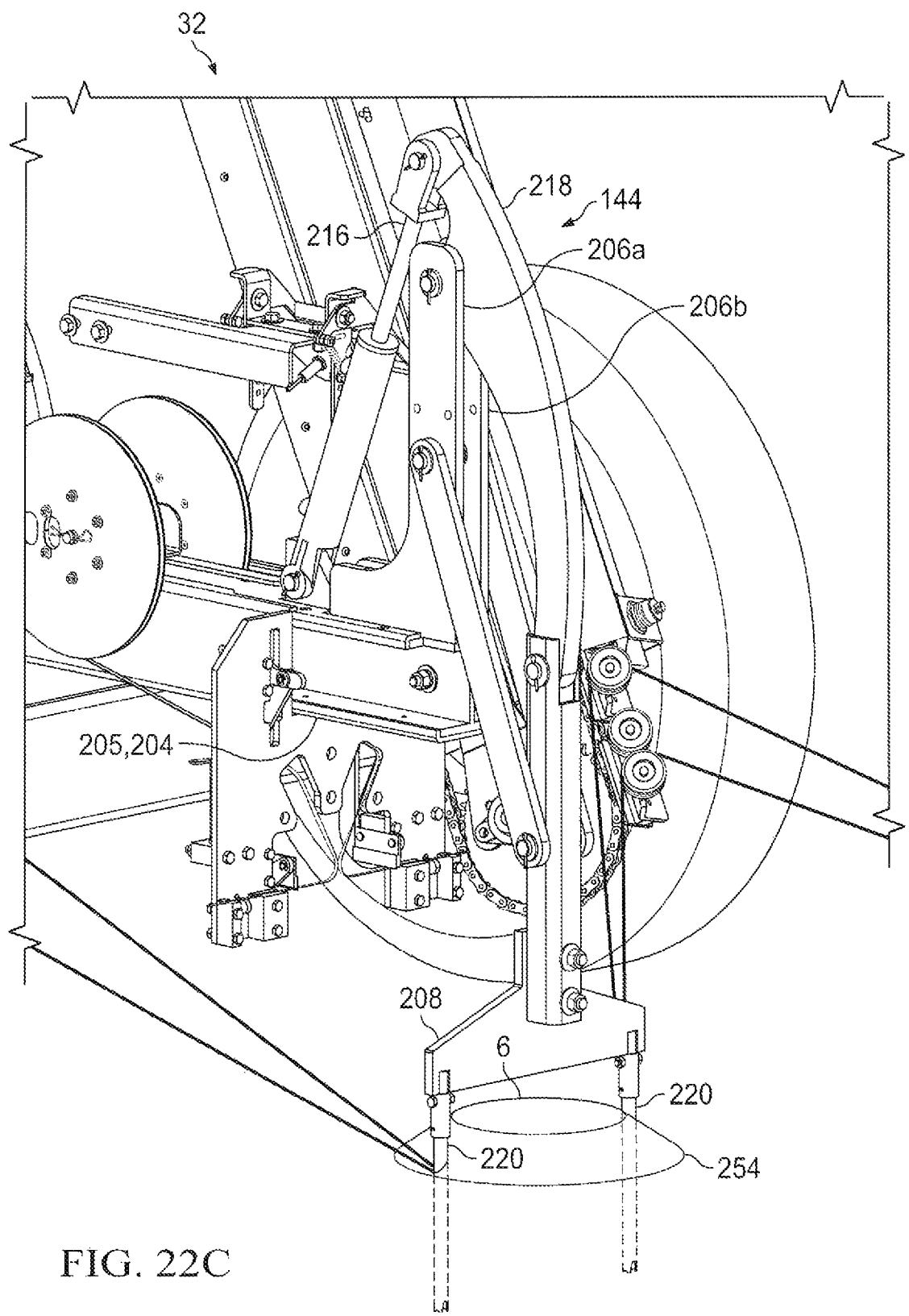
Figure 23:
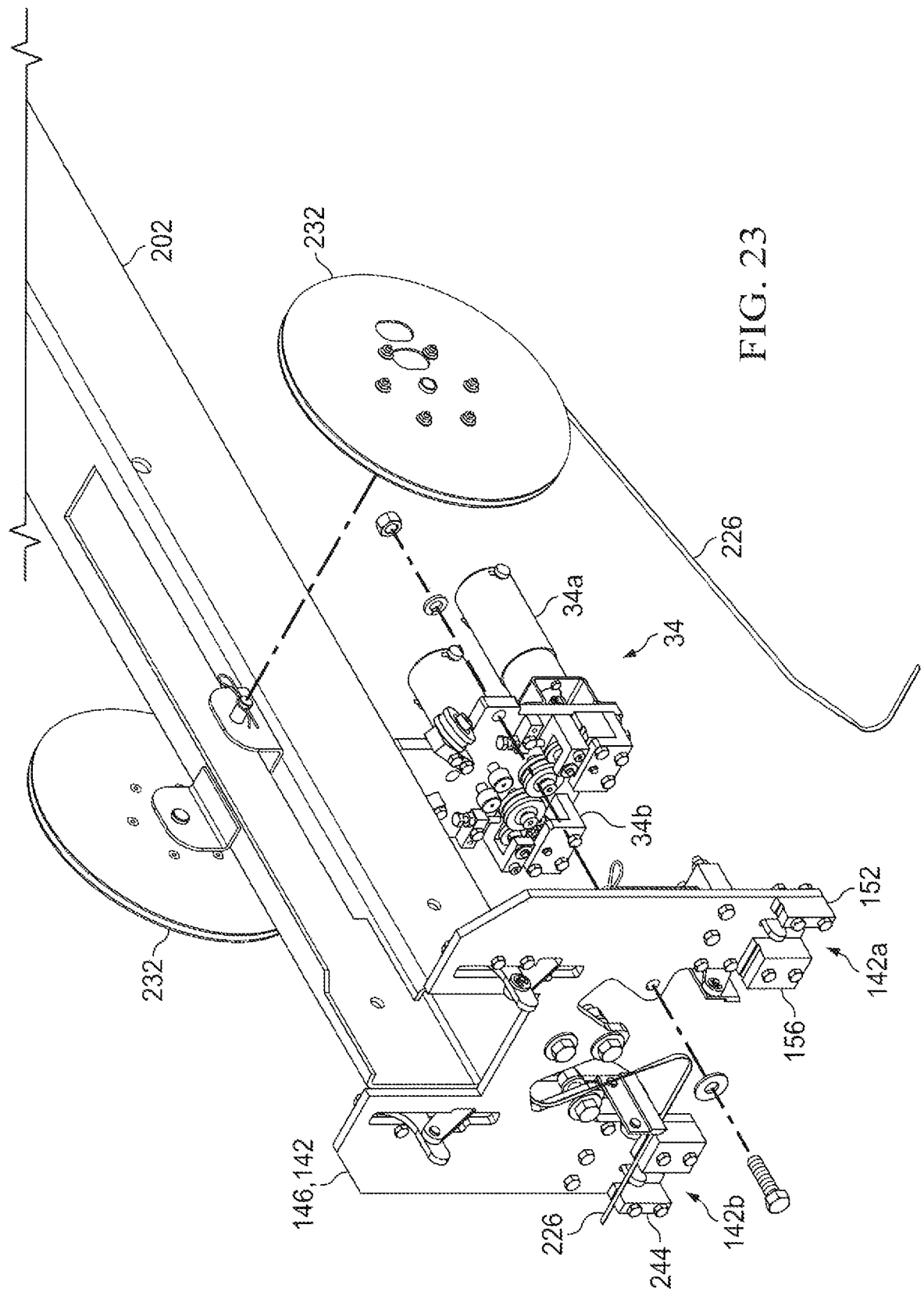
FIG. 23 is a partially exploded perspective view showing the anchor forming assembly 142 and the wire feeding assembly 34 for the anchor forming assembly 142.
Figure 24:
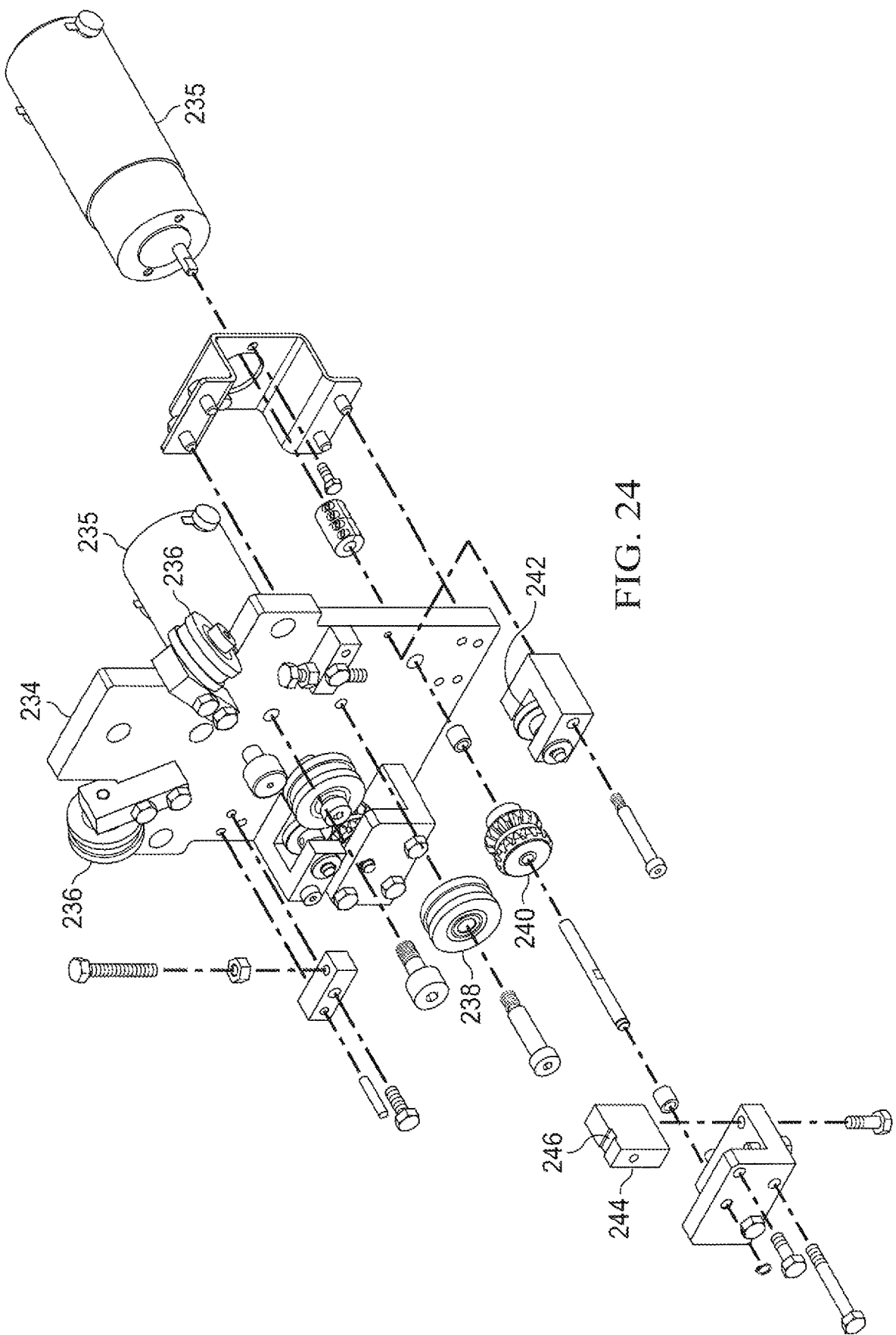
FIG. 24 is a partially exploded perspective view of the wire feeding assembly 34.
Figure 25:
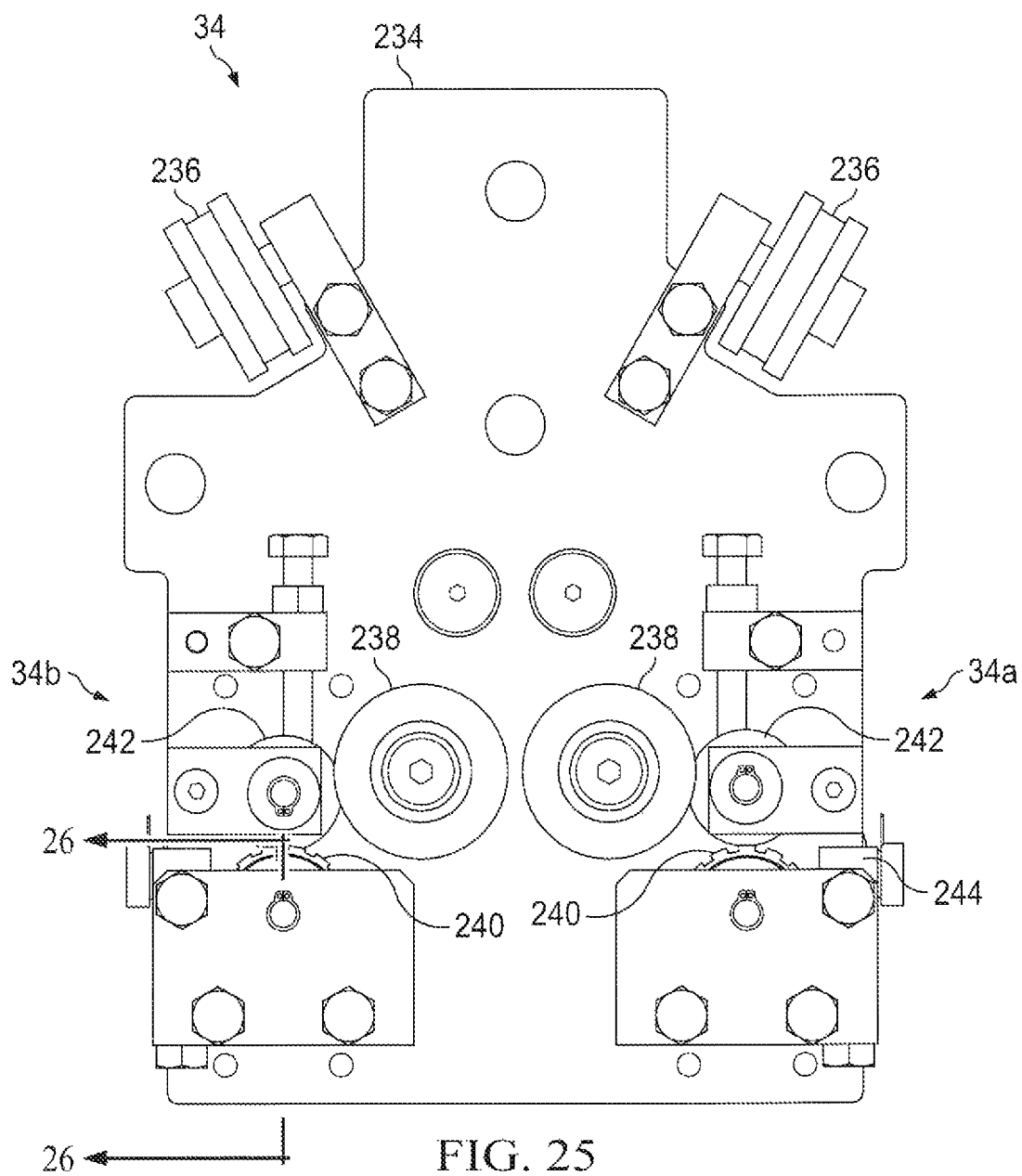
FIG. 25 is an elevational front view of the wire feeding assembly 34.
Figure 26:
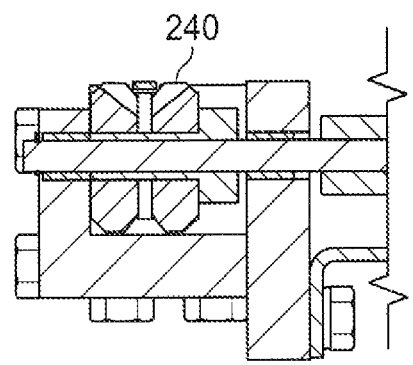
FIG. 26 is a view of a portion of the wire feeding assembly as seen from perspective 26-26 shown in FIG. 25.
Figure 27:
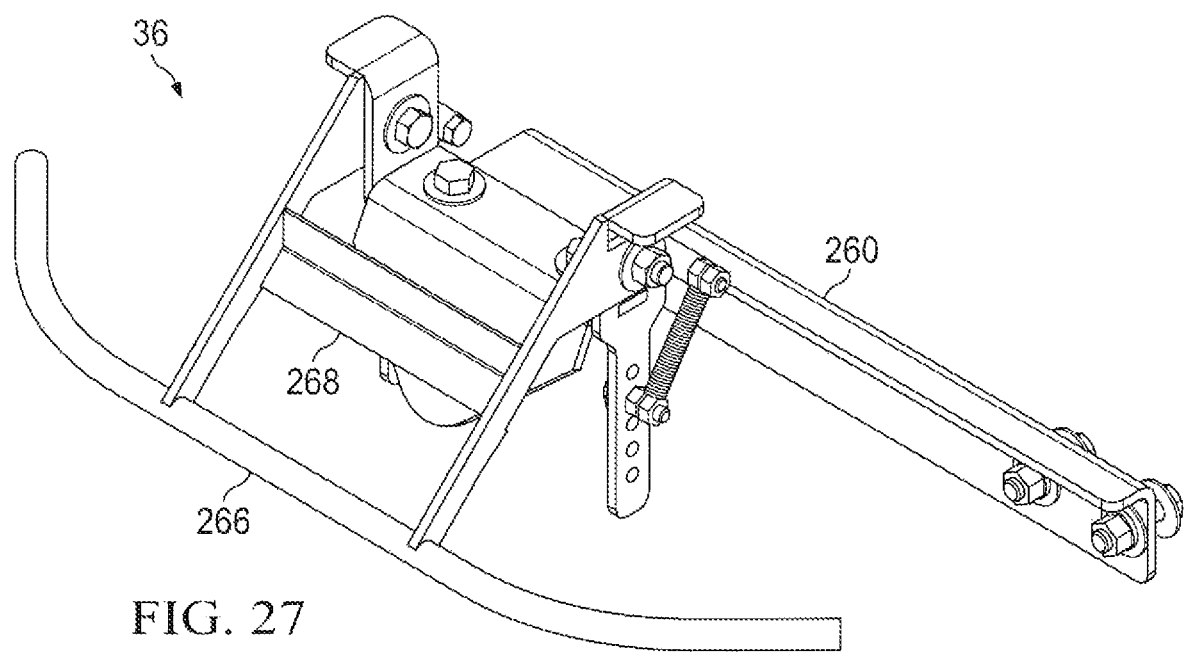
FIG. 27 is a perspective view of an embodiment 36 of a line tension monitoring assembly used in the inventive stringing apparatus 2.
Figure 28:
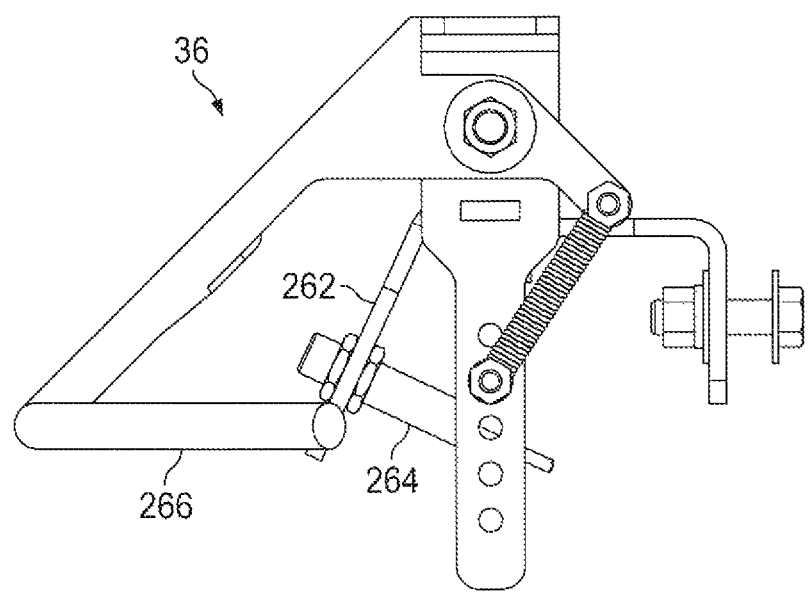
FIG. 28 is an elevational end view of the line tension monitoring assembly 36.
Figure 29:
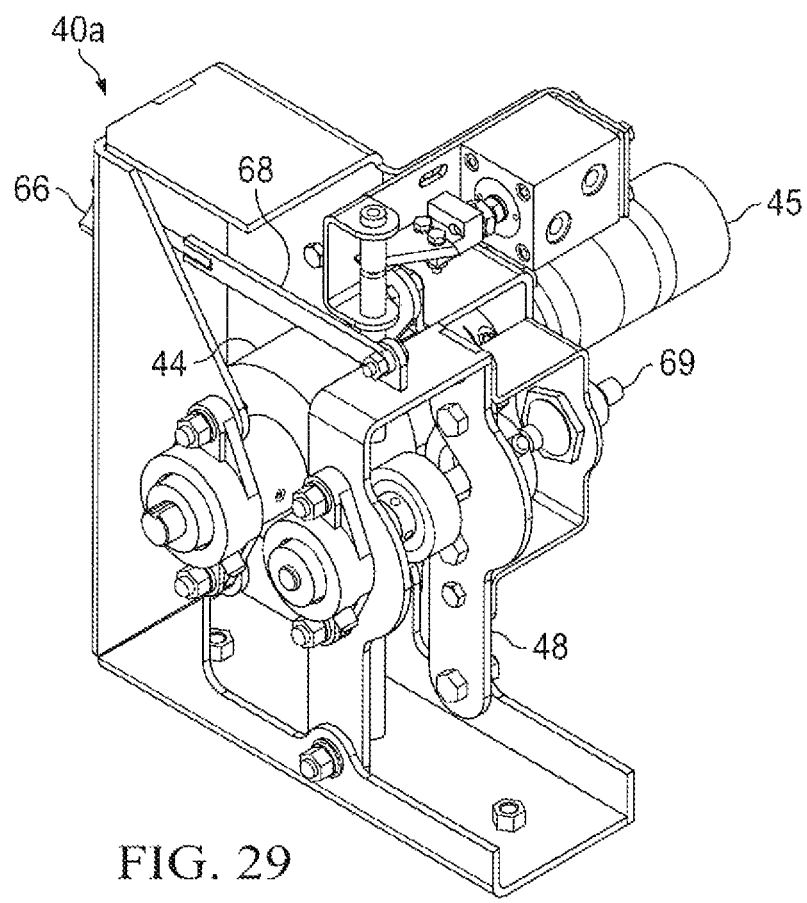
FIG. 29 is a front perspective view of a feeding and cutting assembly 40a used in the line measuring and cutting assembly 26.
Figure 30:
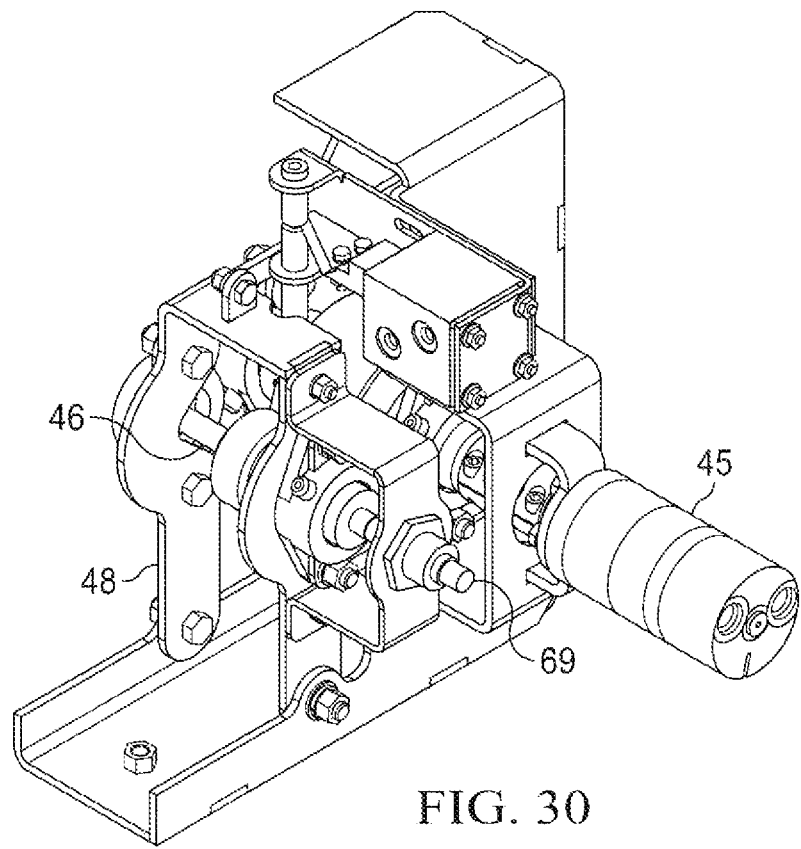

Then, as the staking rods 220 continue to drive the staking anchors 248a and 248b downward (a) the lower ends of the pair of right hand bine support lines 10a and 10b are received in the central bottom notch of the W-shaped right side staking anchor 248a, (b) the lower ends of the pair of left hand bine support lines 10c and 10d are received in the central bottom notch of the W-shaped left side staking anchor 248b, and (c) as illustrated in FIGS. 22B and 22C, the staking rods 220 drive the anchor 248a, the anchor 2486b, and the lower ends of the lines 10a, 10b, 10c, and 10d into the ground 254.

When the staking rods 220 contact the ground 254 at the desired location for staking the hop mound 6, the sliding base element 204 of the staking plunger assembly 144 slides outwardly in the plunger slide channel 202, to counter the forward movement and speed of the trailer 14 and the tractor 15, so that the staking plunger 208 does not move forward with the trailer 14 during the staking operation. Rather, the staking plunger 208 remains at the mound staking location until after the downward staking motion of the plunger 208 is completed and the operating piston 216 pulls the staking rods 220 out of the ground 254. Once the staking rods 220 have been lifted out of the ground 254, the staking plunger assembly 144 is retracted to its ready position by springs 257, provided in the slide channel 202, which are attached to the sliding base element 204, or by hydraulic cylinders, electric motors and pulleys, pneumatic cylinders or other mechanisms.

In the inventive method, the staking plunger assemblies 144 will preferably be automatically activated when the desired staking locations for the hop mounds 6 are reached based upon the GPS locations of the mounds 6. Before beginning a hop yard stringing operation, a field map which provides the GPS locations of the hop mounds 6 for the hop yard can be uploaded into a detection and control system 255 which is located in or linked to the control system 70 of the inventive stringing apparatus 2.

The GPS locator and antenna 258 for the detection and control system 225 can be mounted on either the pulling vehicle 15 or on the inventive apparatus 2, but will preferably be mounted on the tractor 15 and will be in electronic communication with the control system 70 of the inventive apparatus 2 for activating the staking plunger assemblies 144 when the mound 6 locations are reached. The speed of the tractor 15 and the offset distance from the GPS antenna 258 on the tractor 15 to the staking plunger assembly 144 on the back of the trailer 14 will be factored into the control system logic to ensure that the staking plunger assembly 144 is activated at the correct locations of the hop mounds 6.

It will also be understood that numerous other variations and adaptations of the inventive line staking assemblies 32 described above can alternatively be used in the inventive hop yard stringing apparatus 2. Examples of such alternatives include, but are not limited to (a) pre-forming the staking anchors 248 and loading the pre-formed anchors into a clip, (b) using anchors formed of metal or plastic, or organic materials such as bamboo or wood fiber, (c) using or forming anchors which have V, J, Z, or other shapes, or (e) anchoring the lower ends of the bine support lines 10a, 10b, 10c, and 10d at or above ground level rather than below ground level.

As noted above, a line tension monitoring assembly 36 will preferably be mounted on the plunger slide mechanism of each of the line staking assemblies 32. Each line tension monitoring assembly 36 preferably comprises: a mounting bracket 260; a proximity switch plate 262 which extends from the mounting bracket 260; a proximity switch 264 (e.g., a contact switch or a magnetic, optical, or other non-contact switch) installed on the plate 262; a spring-loaded tension arm 266 which is pivotably mounted on the mounting bracket 260; and a bar 268 on the spring-loaded tension arm 266 which contacts or is otherwise detected by the proximity switch 264.

During operation, the bine support lines 10a. 10b, 10c, and/or 10d for the hop mound 6 will contact the spring-loaded tension arm 266 of one of the line tension monitoring assemblies 32 so that, as the lower ends of the lines are being plunged into the ground 254, and assuming that the lines are straight and sufficiently tensioned, the lines will push the tension arm 266 inward to cause the bar 268 of the tension arm 266 to contact or otherwise be detected by the proximity switch 264. When the bar 268 contacts or is otherwise detected by the proximity switch 264, the proximity switch 264 will send a signal to the control system 70 which will then cause the operating piston 216 of the stake plunger assembly 144 to withdraw the staking rods 220 of the staking plunger 208 from the ground and return the staking plunger 208 to its ready position for staking the next hop mound 6.

On the other hand, if the proximity switch 268 is not activated, meaning that the lines were not sufficiently tensioned, an error code is entered for the hop mound 6 and a limit switch, provided on the operating piston 216 of the stake plunger assembly 144 or provided elsewhere, will stop the downward thrust of the staking plunger 208 and will cause the operating piston 216 to withdraw the staking rods 220 of the staking plunger 208 from the ground and return the staking plunger 208 to its ready position for staking the next hop mound 6.

Thus, the present invention is well adapted to carry out the objects and attain the ends and advantages mentioned above as well as those inherent therein. While presently preferred embodiments have been described for purposes of this disclosure, numerous changes and modifications will be apparent to those in the art. Such changes and modifications are encompassed within this invention as defined by the claims.

What is claimed is:

1. An apparatus for stringing a hop yard comprising:
   a non-powered or powered vehicle;
   a worker platform structure on the non-powered or powered vehicle; and
   a line measuring and cutting assembly on the worker platform structure, the line measuring and cutting assembly comprising:
      a housing having an inlet opening for a stringing line and a discharge opening for the stringing line,
      a driven wheel or driven roller mounted in the housing and an idler wheel or idler roller mounted in the housing adjacent to the driven wheel or driven roller to form a pulling nip between the driven wheel or driven roller and the idler wheel or idler roller which receives and pulls the stringing line from the inlet opening and discharges the stringing line for delivery through the discharge opening,
      a length detecting or measuring device in the housing which measures, or detects, a predetermined length of the stringing line, and
      a cutting device positioned in the housing which cuts the stringing line discharged from the pulling nip when a segment of the stringing line of the predetermined length is discharged from the pulling nip.

2. The apparatus of claim 1 further comprising a stringing line guide tube in the housing which extends from the inlet opening toward the pulling nip.

3. The apparatus of claim 2 further comprising a stringing line discharge guide tube in the housing between the outlet opening and the pulling nip.

4. The apparatus of claim 3 wherein the cutting device comprises a cutting blade mounted for reciprocating movement into and out of a break or gap in the stringing line discharge guide tube.

5. The apparatus of claim 1 further comprising:
   a line staking assembly on the non-powered or powered vehicle which stakes a lower end portion of the segment of the stringing line of the predetermined length at, below, or above a ground level and
   a line transfer assembly on the non-powered or powered vehicle which transfers the lower end portion of the segment of the stringing line of the predetermined length from the worker platform structure to the line staking assembly.

6. The apparatus of claim 5 wherein the line transfer assembly comprises:
   a transfer chain, belt or cable which extends between the worker platform structure and the line staking assembly and
   a line clip carried by the transfer chain, belt, or cable which is transferred by the transfer chain, belt, or cable from an upper end of the line transfer assembly to a lower end on the line transfer assembly and is subsequently transferred from the lower end of the line transfer assembly back to the upper end of the line transfer assembly.

7. The apparatus of claim 6 wherein the line clip comprises an adjacent pair of rollers between which the segment of the stringing line of the predetermined length is received.

8. The apparatus of claim 7 wherein the rollers of the line clip are rotatably mounted.

9. The apparatus of claim 5 wherein the line staking assembly includes a line receiving structure into which the lower end portion of the segment of the stringing line of the predetermined length is delivered by the line transfer assembly.

10. The apparatus of claim 9 wherein the line staking assembly further comprises a plunger assembly comprising:

a sliding base structure;

a staking plunger mounted for vertical movement with respect to the sliding base structure;

a powered piston having a lower end attached to the sliding base structure; and a linkage between an upper end of the powered piston and the staking plunger which drives the staking plunger vertically downward in a plunging movement when the powered piston is extended and raises the staking plunger vertically upward when the powered piston is contracted, the staking plunger including a staking element or structure which takes the lower end portion of the segment of the stringing line of the predetermined length from the line receiving structure, as the staking plunger is driven vertically downward in the plunging movement, and drives the lower end portion of the segment of the stringing line of the predetermined length into the ground.

11. The apparatus of claim 10 wherein the powered piston of the plunger assembly is a hydraulic, electric, or pneumatic piston.

12. The apparatus of claim 10 wherein the staking element or structure of the staking plunger is a rod having a groove extending upwardly in a lower end of the rod.

13. The apparatus of claim 10 further comprising an anchor forming assembly comprising:

a vertical base plate mounted in fixed position with respect to the sliding base structure of the plunger assembly;

a pair of anchor wire supports attached to the vertical base plate such that a segment of anchor wire will rest on top of the anchor wire supports, the anchor wire supports being spaced apart so that the staking element or structure of the staking plunger will travel downwardly between the anchor wire supports; and a spring loaded wire bending foot which projects through the vertical base plate between the anchor wire supports.

14. The apparatus of claim 10 further comprising a line tension monitoring assembly mounted on the sliding base structure of the plunger assembly, the tension monitoring assembly comprising a proximity switch and a spring mounted tension arm which (i) is pivotably mounted with respect to the proximity switch and (ii) is contacted by the segment of the stringing line of the predetermined length and pushed by the segment of the stringing line of the predetermined length toward the proximity switch as the staking plunger drives the lower end portion of the segment of the stringing line of the predetermined length into the ground.

15. The apparatus of claim 5 further comprising a GPS instrument on the non-powered or powered vehicle, or on another powered vehicle which pulls the apparatus, and wherein the line staking assembly will automatically stake the lower end portion of the segment of the stringing line of the predetermined length at, below, or above the ground level when the line staking assembly is positioned over a predetermined GPS staking location.

\* \* \* \* \*